United States Patent
Noh et al.

(10) Patent No.: US 12,289,265 B2
(45) Date of Patent: Apr. 29, 2025

(54) METHOD AND APPARATUS FOR SUPPORTING A-PPDU TRANSMISSION IN SOUNDING PROTOCOL SEQUENCE IN A WIRELESS COMMUNICATION SYSTEM

(71) Applicant: Senscomm Semiconductor Co., Ltd., Suzhou (CN)

(72) Inventors: Yujin Noh, Irvine, CA (US); Seung Hyeok Ahn, Irvine, CA (US); Seung Ho Choo, Suzhou (CN); Young-Hwan Kang, Pyeongtaek-si (KR); Jungchul Shin, Seoul (KR); Tan Joong Park, Seoul (KR); Daehong Kim, Irvine, CA (US)

(73) Assignee: Senscomm Semiconductor Co., Ltd., Suzhou (CN)

( * ) Notice: Subject to any disclaimer, the term of this patent is extended or adjusted under 35 U.S.C. 154(b) by 447 days.

(21) Appl. No.: 17/847,364

(22) Filed: Jun. 23, 2022

(65) Prior Publication Data
US 2022/0416971 A1    Dec. 29, 2022

Related U.S. Application Data

(60) Provisional application No. 63/363,300, filed on Apr. 20, 2022, provisional application No. 63/214,116, filed on Jun. 23, 2021.

(51) Int. Cl.
*H04L 5/00* (2006.01)
*H04W 48/10* (2009.01)

(52) U.S. Cl.
CPC .......... *H04L 5/0048* (2013.01); *H04L 5/0064* (2013.01); *H04L 5/0092* (2013.01); *H04W 48/10* (2013.01)

(58) Field of Classification Search
CPC ... H04L 5/0048; H04L 5/0064; H04L 5/0092; H04L 5/0053; H04L 69/322;
(Continued)

(56) References Cited

U.S. PATENT DOCUMENTS

2018/0292518 A1* 10/2018 Chu ...................... G01S 5/0205
2022/0078792 A1*  3/2022 Jeon .................. H04W 72/0453
(Continued)

FOREIGN PATENT DOCUMENTS

KR   10-2017-0042370 A    4/2017
KR   10-2017-0117445 A   10/2017

OTHER PUBLICATIONS

Office Action for KR 10-2022-0077047 by Korean Intellectual Property Office dated Apr. 1, 2024.
(Continued)

*Primary Examiner* — Kiet Tang
(74) *Attorney, Agent, or Firm* — BROADVIEW IP LAW, PC

(57) ABSTRACT

A method performed by an apparatus in a wireless local area network (WLAN) is provided. The method includes: transmitting a first NDP Announcement frame for a first variant and a second NDP Announcement frame for a second variant in A-PPDU transmission, wherein the first NDP Announcement frame for the first variant and the second NDP Announcement frame for the second variant have a same time duration and are transmitted in different frequency bands; and transmitting at least one Sounding NDP for the first variant for both at least one first STA for the first variant and at least one second STA for the second variant, wherein the first variant is based on a first protocol standard and the second variant is based on a second protocol standard, and wherein the second protocol standard is beyond version of the first protocol standard.

18 Claims, 26 Drawing Sheets

(58) Field of Classification Search
CPC . H04L 5/0007; H04L 5/0037; H04L 27/2602; H04L 27/26132; H04W 48/10; H04W 84/12; H04W 72/0453
See application file for complete search history.

(56) References Cited

U.S. PATENT DOCUMENTS

2022/0103317 A1\* 3/2022 Park ................. H04L 27/26132
2024/0187193 A1\* 6/2024 Park .................... H04L 27/2602

OTHER PUBLICATIONS

Office Action for KR 10-2022-0077047 by Korean Intellectual Property Office dated Dec. 20, 2024.

\* cited by examiner

FIG. 4
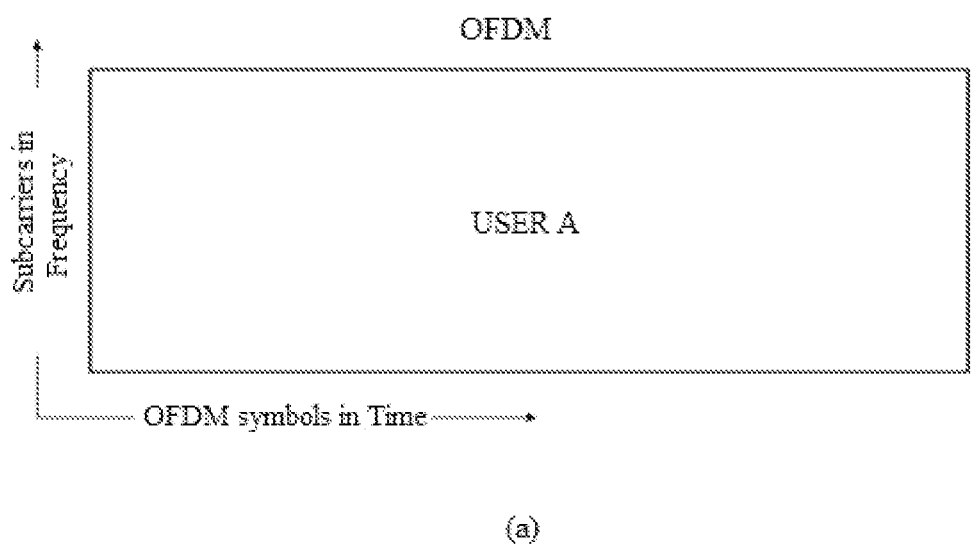
(a)
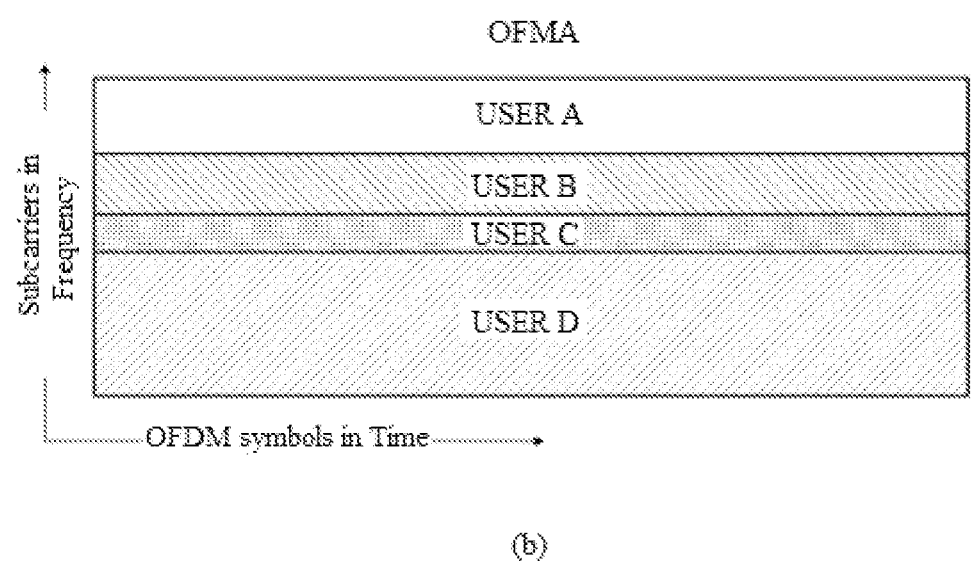
(b)

FIG. 8
800
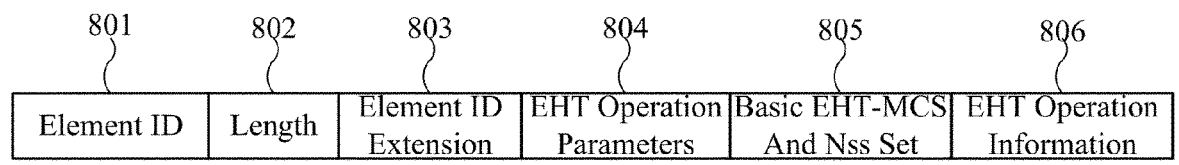
(a)
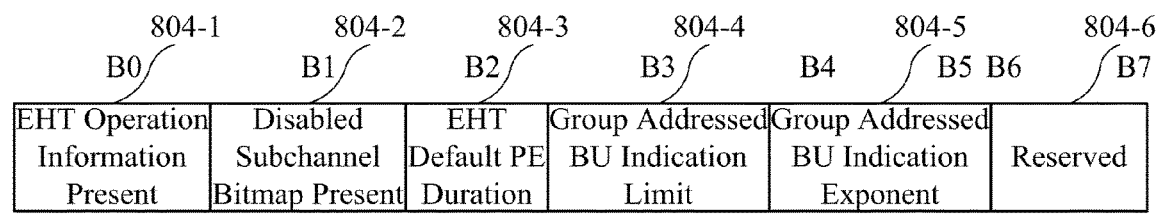
(b)
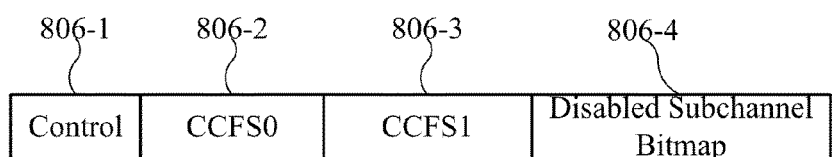
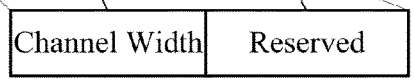
(c)

FIG. 10B

| B0 B3 | B4 B15 | B16 | B17 | B18 B19 | B20 B21 | B22 | B23 B25 |
|---|---|---|---|---|---|---|---|
| Trigger Type | UL Length | More TF | CS Required | UL BW | GI And HE/ EHT-LTF Type/ Triggerd TXOP Sharing Mode | Reserved | Number Of HE/EHT-LTF Symbols |

Bits: 4 | 12 | 1 | 1 | 2 | 2 | 1 | 3

| B26 | B27 | B28 B33 | B34 B35 | B36 | B37 B52 | B53 | B54 |
|---|---|---|---|---|---|---|---|
| Reverved | LDPC Extra Symbol Segment | AP TX Power | Pre-FEC Padding Factor | PE Disambiguity | UL Spatial Reuse | Reverved | HE/EHT P160 |

Bits: 1 | 1 | 6 | 2 | 1 | 16 | 1 | 1

| B55 | B56 B62 | B63 | |
|---|---|---|---|
| Special User Info Field Flag | EHT Reserved | Reverved | Trigger Dependent Common Info |

Bits: 1 | 7 | 1 | variable

FIG. 11

| B0 B11 | B12 B19 | B20 | B21 B24 | B25 | B26 B31 | B32 B38 | B39 | |
|---|---|---|---|---|---|---|---|---|
| AID12 | RU Allocation | UL FEC Coding Type | UL HE-MCS | UL DCM | SS Allocation/ RA-RU Information | UL Target Receive Power | Reserved | Trigger Dependent User Info |
| Bits: 12 | 8 | 1 | 4 | 1 | 6 | 7 | 1 | variable |

(a)

| B0 B11 | B12 B19 | B20 | B21 B24 | B25 | B26 B31 | B32 B38 | B39 | |
|---|---|---|---|---|---|---|---|---|
| AID12 | RU Allocation | UL FEC Coding Type | UL EHT-MCS | Reserved | SS Allocation/ RA-RU Information | UL Target Receive Power | PS160 | Trigger Dependent User Info |
| Bits: 12 | 8 | 1 | 4 | 1 | 6 | 7 | 1 | variable |

(b)

New EHT Sounding NDP format

METHOD AND APPARATUS FOR SUPPORTING A-PPDU TRANSMISSION IN SOUNDING PROTOCOL SEQUENCE IN A WIRELESS COMMUNICATION SYSTEM

CROSS REFERENCE TO PRIOR APPLICATIONS

The present application is based on and claims priority under 35 U.S.C. § 119 of U.S. Provisional Patent Application No. 63/214,116, filed Jun. 23, 2021, and U.S. Provisional Patent Application No. 63/363,300, filed Apr. 20, 2022, the disclosure of which is incorporated herein by reference in its entirety.

BACKGROUND

The present disclosure relates to a method and apparatus for supporting A-PPDU transmission in sounding protocol sequence in a wireless communication system.

Wi-Fi is a Wireless Local Area Network (WLAN) technology that allows devices to access the Internet in the different frequency bands such as 2.4 GHz, 5 GHz, 6 GHz or 60 GHz frequency bands.

WLANs are based on the Institute of Electrical and Electronic Engineers (IEEE) 802.11 standard. The Wireless Next Generation Standing Committee (WNG SC) of IEEE 802.11 is an ad hoc committee that considers the next generation WLAN in the medium to long term.

The legacy IEEE 802.11a/b/g/n/ac does not guarantee communication stability in dense environments with many users. In order to overcome this limit, the IEEE 802.11ax as the WLAN system supporting High Efficiency (HE) has been developed. The IEEE 802.11ax aims to improve system throughput in dense environments.

Recently, there is a need for a new WLAN system to support maximum data throughput than the data throughput supported by IEEE 802.11ax.

IEEE 802.11be also known as Extremely High Throughput (EHT) WLAN is built upon 802.11ax, focusing on extremely high speed and extremely low latency for the wireless communication service such as 4 k and 8 k video streaming, virtual reality/augmented reality (VR/AR), etc.

The scope of IEEE 802.11be, often discussed in the next-generation WLAN task group, also known as IEEE 802.11be or Extremely High Throughput (EHT) WLAN, includes: 1) 320 MHz bandwidth and more efficient utilization of non-contiguous spectrum, 2) multiple RU (MRU) operation 3) Multi-band/multi-channel aggregation and operation (also referred to multiple link operation (MLO)), 4) 16 spatial streams and Multiple Input Multiple Output (MIMO) protocols enhancements, 5) Multi-Access Point (AP) Coordination (e.g. coordinated and joint transmission), 6) Enhanced link adaptation and retransmission protocol (e.g. Hybrid Automatic Repeat Request (HARD)), 7) if needed, adaptation to regulatory rules specific to 6 GHz spectrum, 8) Integrating Time-Sensitive Networking (TSN) extensions for low-latency real-time traffic (IEEE 802.11aa).

SUMMARY

In one embodiment, a method performed by an apparatus in a WLAN is provided. The method comprises: transmitting a first NDP Announcement frame for a first variant and a second NDP Announcement frame for a second variant in A-PPDU transmission, wherein the first NDP Announcement frame for the first variant and the second NDP Announcement frame for the second variant have a same time duration and are transmitted in different frequency bands; and transmitting at least one Sounding NDP for the first variant for both at least one first STA for the first variant and at least one second STA for the second variant, wherein the first variant is based on a first protocol standard and the second variant is based on a second protocol standard, and wherein the second protocol standard is beyond version of the first protocol standard.

In another embodiment, an apparatus in a WLAN is provided. The apparatus comprising: a transceiver; and a processor configured to: control the transceiver to transmit a first NDP Announcement frame for a first variant and a second NDP Announcement frame for a second variant in A-PPDU transmission, wherein the first NDP Announcement frame for the first variant and the second NDP Announcement frame for the second variant have a same time duration and are transmitted in different frequency bands; and control the transceiver to transmit at least one Sounding NDP for the first variant for both at least one first STA for the first variant and at least one second STA for the second variant, wherein the first variant is based on a first protocol standard and the second variant is based on a second protocol standard, and wherein the second protocol standard is beyond version of the first protocol standard.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates difference between OFDM and OFDMA according to an embodiment of the present disclosure.

FIG. 8 illustrates an example of the EHT Operation element format according to an embodiment of the present disclosure.

FIGS. 10A and 10B illustrate an example of the Common Info field in the new Trigger frame according to an embodiment of the present disclosure.

FIG. 11 illustrates an example of the User Info field in the new Trigger frame according to an embodiment of the present disclosure.

DETAILED DESCRIPTION

Figure 1:
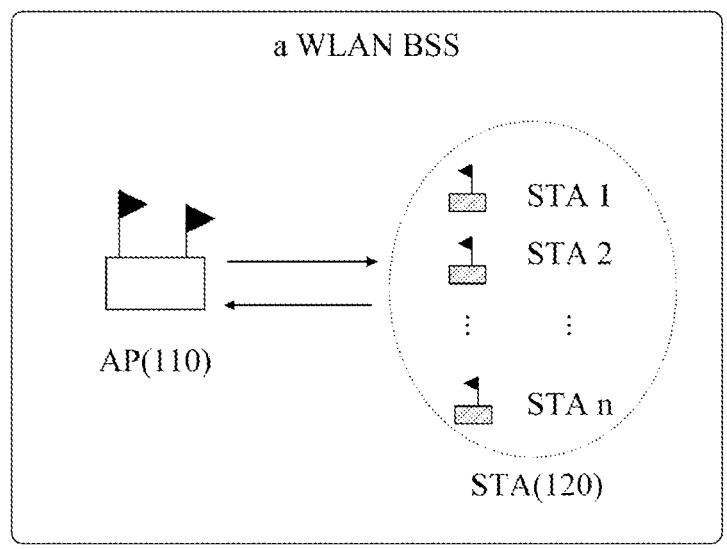
FIG. 1 illustrates an example BSS in a WLAN according to an embodiment of the present disclosure.

The following detailed description of the embodiments of the present disclosure is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the present disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The following detailed description of the embodiments of the present disclosure applies to a wireless local area network (WLAN). The following description may apply to the next generation WLAN method (IEEE 802.11be) or the like. The IEEE 802.11be maintains compatibility with the conventional IEEE 802.11a/b/g/n/ac/ax (Hereinafter referred to as "11a/b/g/n/ac/ax"). The following description may be executed in the IEEE 802.11be (Hereinafter referred to as "11be") environment, and also maintains compatibility with the conventional 11a/b/g/n/ac/ax.

In a WLAN, a single basic service set (BSS) is composed of two kinds of entity which are a single AP Station (STA) and a plurality of non-AP STAs. STAs share a same radio frequency channel with one out of WLAN operation bandwidth options (e.g., 20/40/80/160/320 MHz). Here, AP STA and non-AP STA could be referred as AP and STA, respectively.

WLAN has included operation of multiple users' frame transmissions and receptions simultaneously wherein frame exchanges are scheduled under the specific rule within a BSS. Here multi-user (MU) transmission means that the frames in a certain BSS are transmitted to (e.g., downlink (DL) MU) or from (e.g., uplink (UL) MU) a plurality of STAs simultaneously based on different resources. For example, different resources could be different frequency resources in orthogonal frequency division multiplexing access (OFDMA) transmission or different spatial streams in multi MU-multiple input multiple output (MIMO) transmission with DL-OFDMA, DL-MU-MIMO, UL-OFDMA, and UL-MU-MIMO of MU transmission as shown in FIG. 1 below.

FIG. 1 illustrates an example BSS in a WLAN according to an embodiment of the present disclosure.

Referring to FIG. 1, a WLAN BSS 100 may include a one AP 110 and a plurality of STAs 120. Any one of the plurality of STAs 120 may receive resource allocated for MU transmission and communicate with the AP 110. The AP 110 may deliver information regarding the resource allocation for MU transmission to any one of the plurality of STAs 120. The plurality of STAs 120 may receive/transmit, from/to the AP 110, the frames simultaneously in the WLAN BSS 100 based on the allocated resources for MU transmission.

Figure 2A:
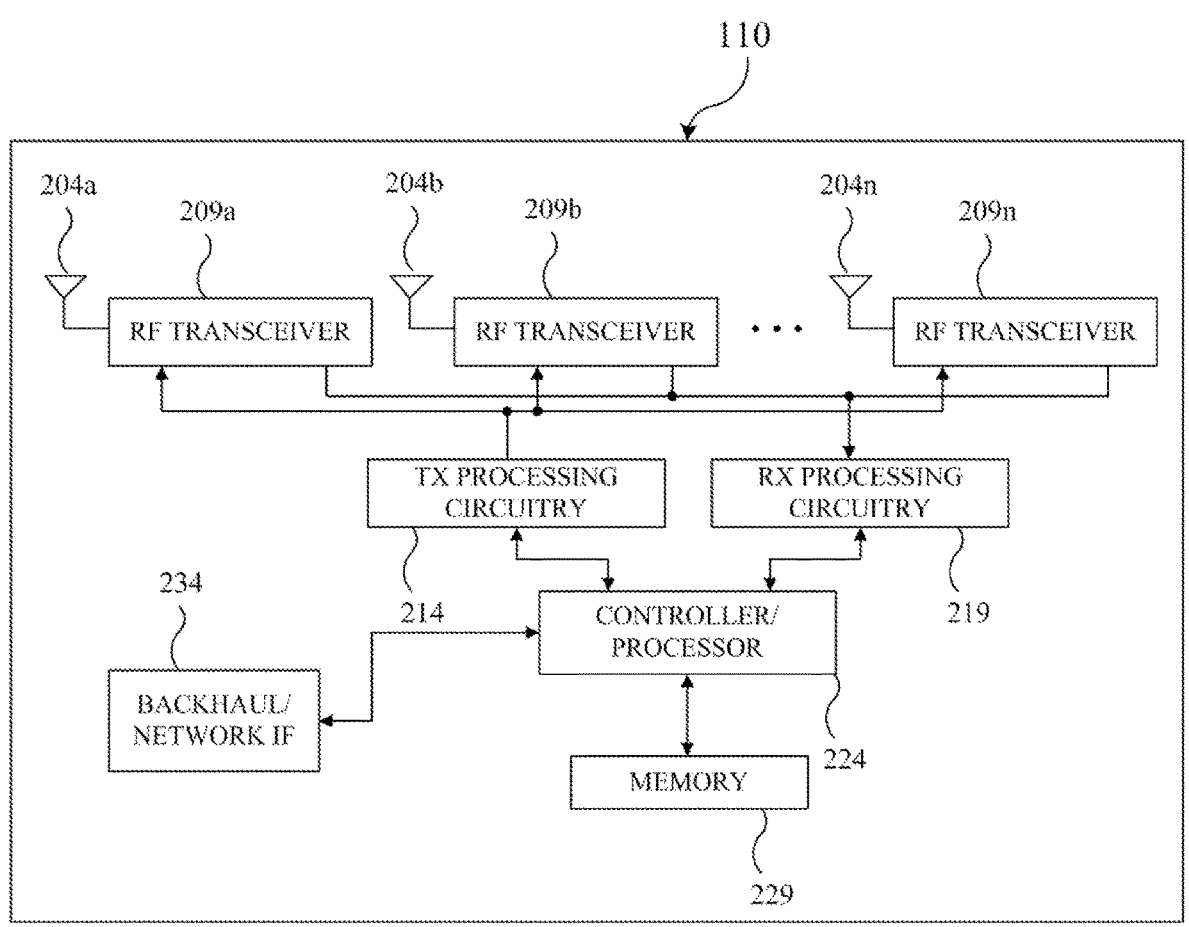
FIG. 2A illustrates an example AP 110 according to an embodiment of the present disclosure.

FIG. 2A illustrates an example AP 110 according to an embodiment of the present disclosure. The embodiment of the AP 110 illustrated in FIG. 2A is for illustration only, and the AP 110 of FIG. 1 could have the same or similar configuration. However, APs come in a wide variety of configurations, and FIG. 2A does not limit the scope of the present disclosure to any particular implementation of an AP.

As shown in FIG. 2A, the AP 110 includes multiple antennas 204a-204n, multiple RF transceivers 209a-209n, transmit (TX) processing circuitry 214, and receive (RX)

processing circuitry 219. The AP 110 also includes a controller/processor 224, a memory 229, and a backhaul or network interface 234.

The RF transceivers 209a-209n receive, from the antennas 204a-204n, incoming RF signals, such as signals transmitted by STAs in the WLAN BSS 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 110. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs). Any of a wide variety of other functions could be supported in the AP 110 by the controller/processor 224 including a combination of DL MU-MIMO and OFDMA in the same transmit opportunity. In some embodiments, the controller/processor 224 includes at least one microprocessor or microcontroller.

The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 110 to communicate with other devices or systems over a backhaul connection or over a network. The interface 234 could support communications over any suitable wired or wireless connection(s). For example, the interface 234 could allow the AP 110 to communicate over a wired or wireless local area network or over a wired or wireless connection to a larger network (such as the Internet). The interface 234 includes any suitable structure supporting communications over a wired or wireless connection, such as an Ethernet or RF transceiver.

The memory 229 is coupled to the controller/processor 224. Part of the memory 229 could include a RAM, and another part of the memory 229 could include a Flash memory or other ROM.

As described in more detail below, the AP 110 may include circuitry and/or programming for management of channel sounding procedures in WLANs. Although FIG. 2A illustrates one example of AP 101, various changes may be made to FIG. 2A. For example, the AP 110 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 110 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
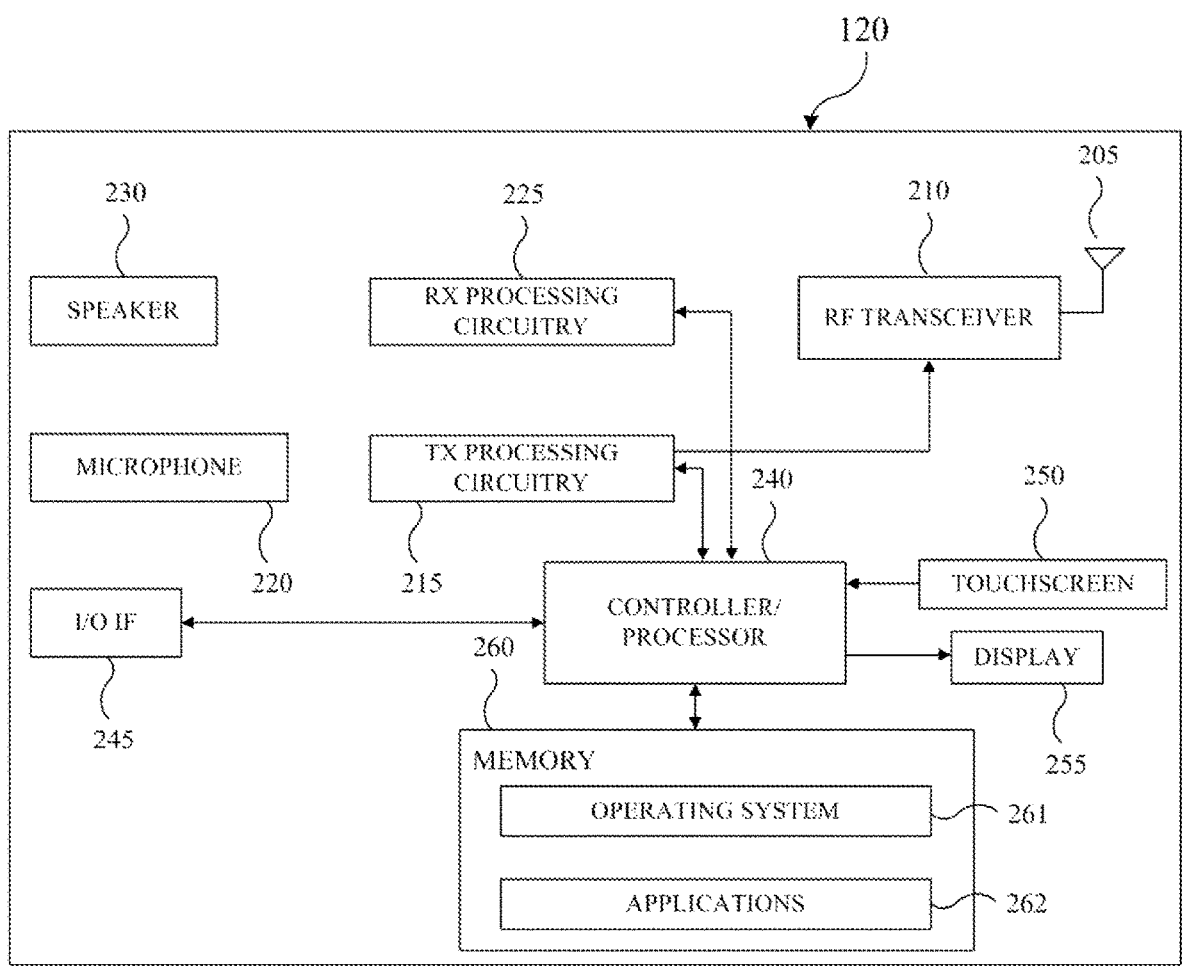
FIG. 2B illustrates an example STA 120 according to an embodiment of the present disclosure.

FIG. 2B illustrates an example STA 120 according to an embodiment of the present disclosure. The embodiment of the STA 120 illustrated in FIG. 2B is for illustration only, and the STAs 120 of FIG. 1 could have the same or similar configuration. However, STAs come in a wide variety of configurations, and FIG. 2B does not limit the scope of the present disclosure to any particular implementation of a STA.

As shown in FIG. 2B, the STA 120 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the WLAN BSS 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 120. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to provide management of channel sounding procedures in WLANs. In some embodiments, the controller/processor 240 includes at least one microprocessor or microcontroller.

The controller/processor 240 is also capable of executing other processes and programs resident in the memory 260, such as operations for management of channel sounding procedures in WLANs. The controller/processor 240 can move data into or out of the memory 260 as required by an executing process. In some embodiments, the controller/processor 240 is configured to execute a plurality of applications 262, such as applications for channel sounding, including feedback computation based on a received null data packet (NDP) Announcement frame and NDP frame and transmitting the beamforming feedback report in response to a Trigger frame. The controller/processor 240 can operate the plurality of applications 262 based on the OS program 261 or in response to a signal received from an AP. The main controller/processor 240 is also coupled to the I/O interface 245, which provides STA 120 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 120 can use the touchscreen 250 to enter data into the STA 111. The display 255 may be a liquid crystal display, light emitting diode display, or other display capable of rendering text and/or at least limited graphics, such as from web sites.

The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 120, various changes may be made to FIG. 2B. For example, various components in FIG. 2B could be combined, further subdivided, or omitted and additional components could be added according to particular needs. In particular examples, the STA 120 may include any number of antenna(s) 205 for MIMO communication with an AP 110. In another example, the STA 120 may not include voice communication or the controller/processor 240 could be divided into multiple processors, such as one or more central processing units (CPUs) and one or more graphics processing units (GPUs). Also, while FIG. 2B illustrates the STA 120 configured as a mobile telephone or smartphone, STAs could be configured to operate as other types of mobile or stationary devices.

Multi-user access modulation, for example, OFDMA for uplink and downlink has been introduced since High Efficiency (HE) WLAN, 11ax and after such future amendments such as extreme high throughput (EHT), and one or more STAs are allowed to use one or more resource units (RUs) throughout operation bandwidth and transmit at the same time. One RU is the minimum granularity which can be assigned and has decades of subcarriers in OFDM modulation symbol. Here, STAs could be associated or non-associated with AP when responding simultaneously in the assigned RUs within a specific period (e.g., SIFS, short inter frame space) as shown in FIG. 3 below.

Figure 3:
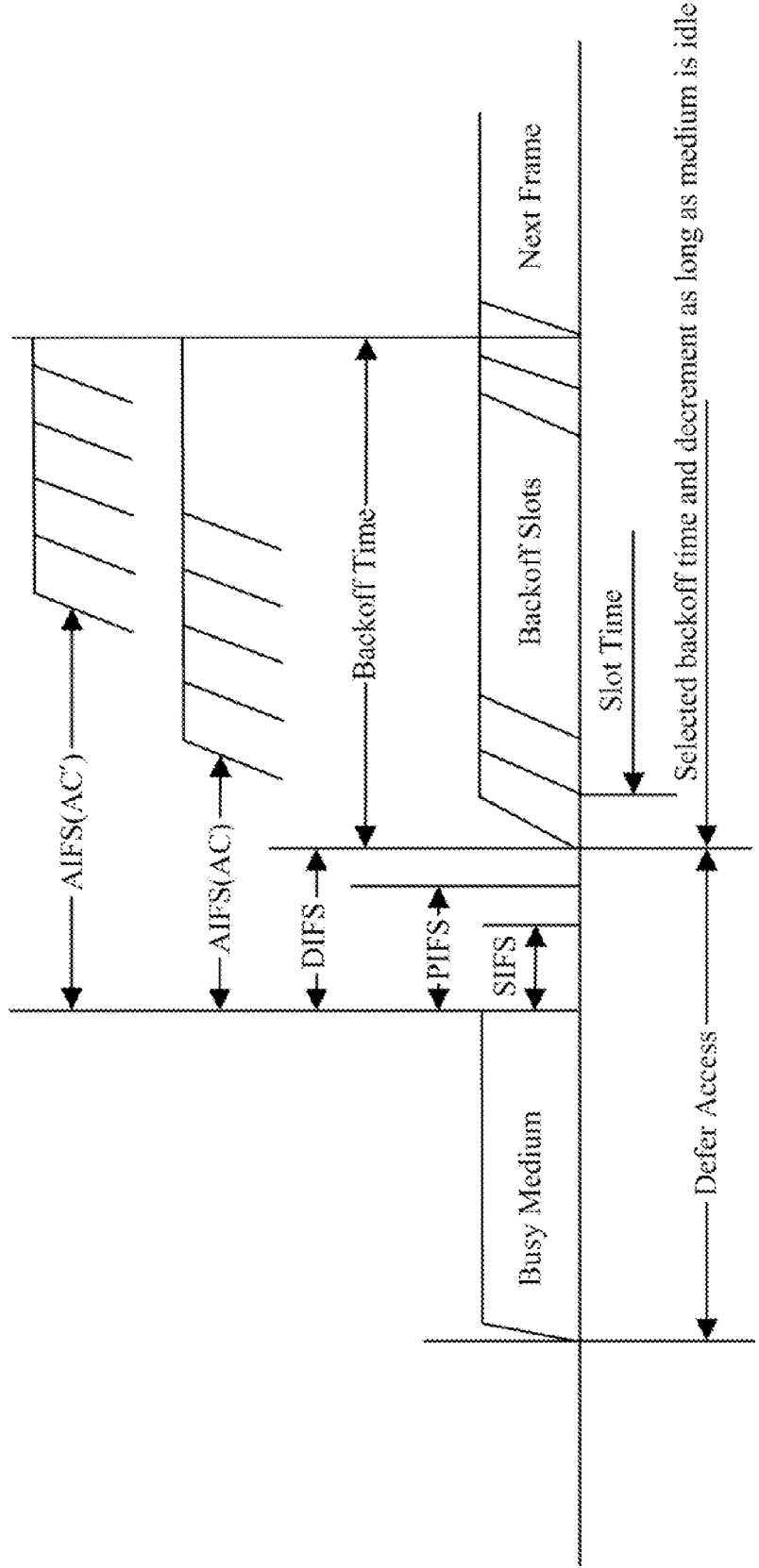
FIG. 3 illustrates different types of IFS in a WLAN according to an embodiment of the present disclosure.

FIG. 3 illustrates different types of IFS in a WLAN according to an embodiment of the present disclosure.

Referring to FIG. 3, inter frame space (IFS) is waiting periods between transmission of frames operating in the medium access control (MAC) sublayer where carrier-sense multi access/collision avoidance (CSMA/CA) is used. For example, IFS is the time period between completion of the transmission of the last frame and starting transmission of the next frame apart from the variable back-off period. The IEEE 802.11 standard defines various types of IFS such as short IFS (SIFS), point coordination function (PCF) IFS (PIFS), distributed coordination function (DCF) IFS (DIFS), and arbitration IFS (AIFS) to provide priority levels for access to wireless media. The relationship between the different IFS is illustrated in FIG. 3. SIFS is used for an acknowledgement (ACK) and for a ready to send (RTS) frame and clear to send (CTS) frame based high priority transmission. For example, if the control frame is a response frame of a previous frame, the WLAN device transmits the control frame without performing backoff if a SIFS has elapsed. PIFS is used in contention-free period (CFP) in PCF mode. For example, after the PIFS has elapsed, STAs having data to be transmitted in contention free period cand be initiated. DIFS is used for contention-based services/applications. For example, using DCF mode, a STA needs to sense the status of the wireless channel before the STA can place its request to transmit a frame. AIFS is used by quality of service (QoS) STAs to transmit all data frames management frames (e,g., MAC management protocol data units (MMPDUs)) and control frames (e.g., power save-poll (PS-Poll), RTS, CTS).

OFDMA is an OFDM-based multiple access scheme where different subsets of subcarriers are allocated to different users, allowing simultaneous data transmission to or from one or more users with high accurate synchronization for frequency orthogonality.

FIG. 4 illustrates difference between OFDM and OFDMA according to an embodiment of the present disclosure.

Referring to FIG. 4, in OFDM, a single user (e.g., USER A) is allocated whole subcarriers, while, in OFDMA, a plurality of users (e.g., USER A, USER B, USER C, and USER D) are allocated different subsets of subcarriers which can change from one physical layer convergence protocol (PLCP) protocol data unit (PPDU) to the next. In OFDMA, an OFDM symbol is constructed of subcarriers, the number of which is a function of the PPDU bandwidth.

In case of UL MU transmission, given different STAs with its own capabilities and features, AP may want to have more control mechanism of the medium by using more scheduled access, which may allow more frequent use of OFDMA/MU-MIMO transmissions. PPDUs in UL MU transmission (MU-MIMO or OFDMA) are sent as a response to the Trigger frame sent by the AP. Here, UL MU transmission consists of response frames (e.g., HE (or EHT) trigger-based (TB) PPDU) to a Trigger frame sent by the AP wherein the Trigger frame is supposed to have enough STA's information and assigned RUs. This allows specific STA to transmit the OFDMA based packet format with HE (or EHT) TB PPDU wherein HE (or EHT) TB PPDU is segmented into RU and all RUs as a response of Trigger frame are allocated to the selected non-AP STAs accordingly.

Figure 5:
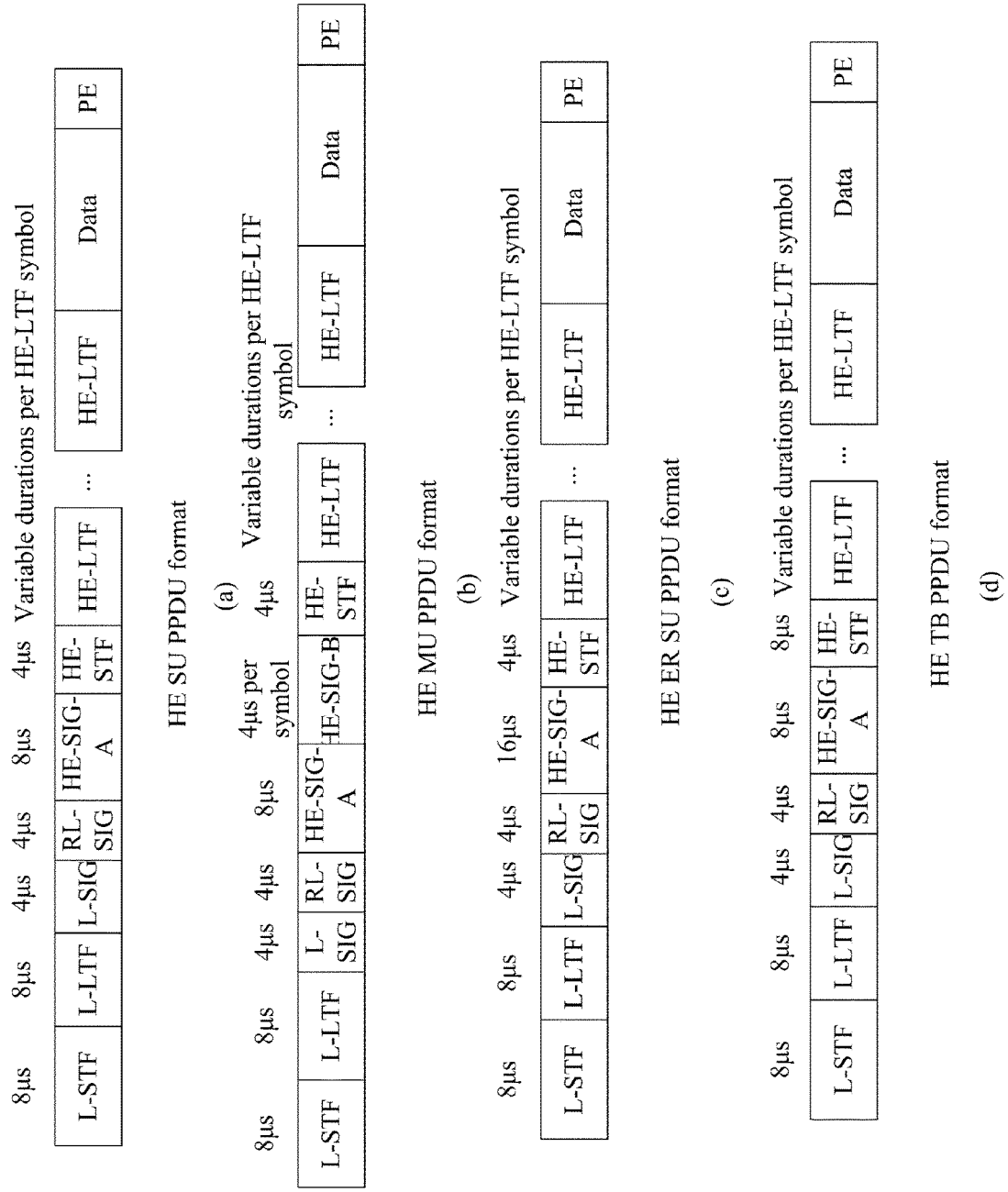
FIG. 5 illustrates an example of HE PPDU format according to an embodiment of the present disclosure.

FIG. 5 illustrates an example of HE PPDU format according to an embodiment of the present disclosure.

Referring to FIG. 5, in HE WLAN, the four HE PPDU formats are defined: HE SU PPDU for single user transmission ((a) of FIG. 5)), HE MU PPDU for multi-user transmission ((b) of FIG. 5)), HE ER SU PPDU for single user to cover extended coverage ((c) of FIG. 5)), and HE TB PPDU for UL multi-user transmission from STAs ((d) of FIG. 5)). The HE PHY supports a discrete Fourier transform (DFT) period of 3.2 µs and 12.8 µs for the pre-HE modulated fields and the HE modulated fields in an HE PPDU respectively. The HE PHY data subcarrier frequency spacing in a quarter of legacy very high throughput (VHT), HT PHY, which enables HE modulated OFDM symbol to have almost 4 multiples of data subcarriers. The fields of the HE PPDU formats are summarized in Table 1 and the L-STF, L-LTF, L-SIG, RL-SIG, HE-SIG-A, and HE-SIG-B fields are referred to as the Pre-HE modulated fields, while HE-STF, HE-LTF and Data fields are referred to as the HE modulated fields.

TABLE 1

| Field | Description |
| --- | --- |
| L-STF | Non-HT Short Training field |
| L-LTF | Non-HT Long Training field |
| L-SIG | Non-HT SIGNAL field |
| RL-SIG | Repeated Non-HT SIGNAAL field |
| HE-SIG-A | HE SIGNAL A field |
| HE-SIG-B | HE SIGNAL B field |
| HE-STF | HE Short Training field |
| HE-LTF | HE Long Training field |
| Data | The Data field carrying the PSDU(s) |
| PE | Packet extension field |

Figure 6:
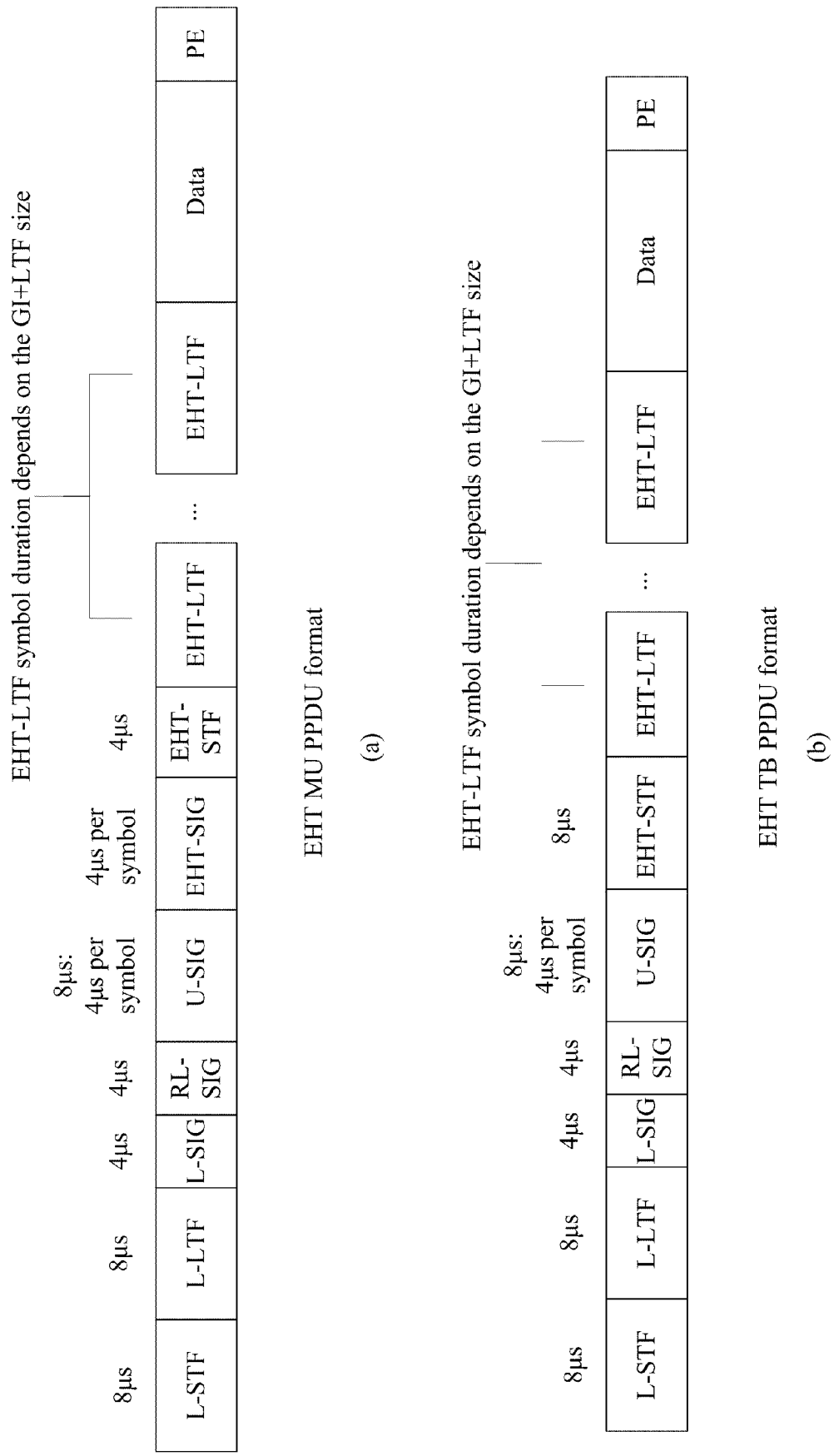
FIG. 6 illustrates an example of EHT PPDU format according to an embodiment of the present disclosure.

FIG. 6 illustrates an example of EHT PPDU format according to an embodiment of the present disclosure.

Referring to FIG. 6, in EHT, two EHT PPDU formats are defined: EHT MU PPDU ((a) of FIG. 6)) and EHT TB PPDU ((b) of FIG. 6)). EHT MU PPDU is used for both single user transmission and multi-user transmission. The EHT MU PPDU is not a response to a triggering frame. In the EHT MU PPDU, the EHT-SIG field is present. EHT TB PPDU is used for a transmission that is a response to a triggering frame from an AP. In the EHT TB PPDU, the EHT-SIG field is not present. The fields of the EHT PPDU formats are summarized in Table 2.

TABLE 2

| Field | Description |
| --- | --- |
| L-STF | Non-HT Short Training field |
| L-LTF | Non-HT Long Training field |
| L-SIG | Non-HT SIGNAL field |
| RL-SIG | Repeated Non-HT SIGNAAL field |
| U-SIG | Universal SIGNAL A field |
| EHT-SIG | EHT SIGNAL field |
| EHT-STF | EHT Short Training field |
| EHT-LTF | EHT Long Training field |
| Data | The Data field carrying the PSDU(s) |
| PE | Packet extension field |

The concept of preamble puncturing has been introduced since 11ax. It is a mechanism whereby OFDMA is used to avoid transmissions in certain subcarriers. For PPDU bandwidths greater than or equal to 80 MHz, the HE PHY supports preamble punctured HE MU PPDU transmissions where pre-HE modulated fields (before HE STF field) are not transmitted in one or more of the nonprimary 20 MHz subchannels, and RUs associated with those punctured 20 MHz subchannels are not allocated. In HE MU PPDU, there is a field to indicate which subchannels are punctured.

In 11be, preamble puncturing is applicable to OFDMA transmission and non-OFDMA transmission (single user transmission or full bandwidth MU-MIMO transmission). In PHY, the puncturing patterns are defined in the Punctured Channel Information field in EHT MU PPDU. For OFDMA cases, a 4-bit bitmap that tells which 20 MHz subchannel is punctured in the relevant 80 MHz subblock is defined where a value of 0 indicates that the corresponding 20 MHz subchannel is punctured. The allowed punctured patterns are defined for an 80 MHz subblock: 1111, 0111, 1011, 1101, 1110, 0011, 1100, and 1001. Its value could be variable for each 80 MHz subblock when channel operating bandwidth is larger than 80 MHz. For non-OFDMA cases, 5 bit of punctured channel indication is used to signal the non-OFDMA puncturing pattern of the entire PPDU bandwidth as shown in Table 3.

TABLE 3

| PPDU bandwidth | Cases | Puncturing pattern | Field value |
| --- | --- | --- | --- |
| 20 MHz | No puncturing | [1 1 1 1] (242-tone RU 1) | 0 |
| 40 MHz | No puncturing | [1 1 1 1] (484-tone RU 1) | |
| 80 MHz | No puncturing | [1 1 1 1] (996-tone RU 1) | 0 |
| | 20 MHz puncturing | [x 1 1 1] (484 +242-tone MRU 1) | 1 |
| | | [1 x 1 1] (484 + 242-tone MRU 2) | 2 |
| | | [1 1 x 1] (484 + 242-tone MRU 3) | 3 |
| | | [1 1 1 x] (484 + 242-tone MRU 4) | 4 |
| 160 MHz | No puncturing | [1 1 1 1 1 1 1 1] (2x996-tone RU 1) | 0 |
| | 20 MHz puncturing | [x 1 1 1 1 1 1 1] (996 + 484 + 242-tone MRU 1) | 1 |
| | | [1 x 1 1 1 1 1 1] (996 + 484 + 242-tone MRU 2) | 2 |
| | | [1 1 x 1 1 1 1 1] (996 + 484 + 242-tone MRU 3) | 3 |
| | | [1 1 1 x 1 1 1 1] (996 + 484 + 242-tone MRU 4) | 4 |
| | | [1 1 1 1 x 1 1 1] (996 + 484 + 242-tone MRU 5) | 5 |
| | | [1 1 1 1 1 x 1 1] (996 + 484 + 242-tone MRU 6) | 6 |
| | | [1 1 1 1 1 1 x 1] (996 + 484 + 242-tone MRU 7) | 7 |
| | | [1 1 1 1 1 1 1 x] (996 + 484 + 242-tone MRU 8) | 8 |
| | 40 MHz puncturing | [x x 1 1 1 1 1 1] (996 + 484-tone MRU 1) | 9 |
| | | [1 1 x x 1 1 1 1] (996 + 484-tone MRU 2) | 10 |
| | | [1 1 1 1 x x 1 1] (996 + 484-tone MRU 3) | 11 |
| | | [1 1 1 1 1 1 x x] (996 + 484-tone MRU 4) | 12 |
| 320 MHz | No puncturing | [1 1 1 1 1 1 1 1] (4x996-tone RU 1) | 0 |
| | 40 MHz puncturing | [x 1 1 1 1 1 1 1] (3x996 + 484-tone MRU 1) | 1 |
| | | [1 x 1 1 1 1 1 1] (3x996 + 484-tone MRU 2) | 2 |
| | | [1 1 x 1 1 1 1 1] (3x996 + 484-tone MRU 3) | 3 |
| | | [1 1 1 x 1 1 11] (3x996 + 484-tone MRU 4) | 4 |
| | | [1 1 11 x 1 1 1] (3x996 + 484-tone MRU 5) | 5 |
| | | [1 1 1 1 x 1 1] (3x996 + 484-tone MRU 6) | 6 |
| | | [1 1 1 1 1 1 x 1] (3x996 + 484-tone MRU 7) | 7 |
| | | [1 1 1 1 1 1 1 x] (3x996 + 484-tone MRU 8) | 8 |
| | 80 MHz puncturing | [x x 1 1 1 1 1 1] (3x996-tone MRU 1) | 9 |
| | | [1 1 x x 1 1 1 1] (3x996-tone MRU 2) | 10 |
| | | [1 1 1 1 x x 1 1] (3x996-tone MRU 3) | 11 |
| | | [1 1 1 1 1 1 x x] (3x996-tone MRU 4) | 12 |
| | Both 80 MHz and 40 MHz puncturing | [x x x 1 1 1 1 1] (2x996 + 484-tone MRU 7) | 13 |
| | | [x x 1 x 1 1 1 1] (2x996 + 484-tone MRU 8) | 14 |

TABLE 3-continued

| PPDU bandwidth | Cases | Puncturing pattern | Field value |
|---|---|---|---|
| | | [x x 1 1 x 1 1 1] (2x996 + 484-tone MRU 9) | 15 |
| | | [x x 1 1 1 x 1 1] (2x996 + 484-tone MRU 10) | 16 |
| | | [x x 1 1 1 1 x 1] (2x996 + 484-tone MRU 1 1) | 17 |
| | | [x x 1 1 1 1 1 x] (2x996 + 484-tone MRU 12) | 18 |
| | | [x 1 1 1 1 1 x x] (2x996 + 484-tone MRU 1) | 19 |
| | | [1 x 1 1 1 1 x x] (2x996 + 484-tone MRU 2) | 20 |
| | | [1 1 x 1 1 1 x x] (2x996 + 484-tone MRU 3) | 21 |
| | | [1 1 1 x 1 1 x x] (2x996 + 484-tone MRU 4) | 22 |
| | | [1 1 1 1 x 1 x x] (2x996 + 484-tone MRU 5) | 23 |
| | | [1 1 1 1 1 x x x] (2x996 + 484-tone MRU 6) | 24 |

Note that in the puncturing patterns in Table 3 above, a "1" denotes a non-punctured subchannel and an "x" denotes a punctured subchannel. The puncturing granularity for 80 MHz and 160 MHz PPDU bandwidth is 20 MHz, and the puncturing granularity for 320 MHz PPDU bandwidth is 40 MHz.

In 11be, preamble puncturing is appliable to different type of frames. The indication of which subchannels are punctured in a control (e.g., RTS, MU-RTS Trigger, CTS or etc.), data or management frame that is carried in a non-HT duplicate PPDU can be conveyed from the MAC to the PHY through the TXVECTOR parameter INACTIVE_SUB-CHANNELS. The parameter INACTIVE_SUBCHAN-NELS may be present in the TXVECTOR of a non-HT duplicate PPDU or EHT PPDU that carries a control, data or management frame. Given 11be supporting up to 320 MHz channel bandwidth, size of the parameter INACTIVE_SUB-CHANNELS should be 16 bits. For the new amendments, the basic assumption is that now the parameter INACTIVE-_SUBCHANNELS could be used in not only non-HT duplicate PPDU but also EHT PPDU. And puncturing pattern signaling is not limited to NDP Announcement frame or NDP frame.

Given at least two different types of indication being defined, there is need to set up a rule. On top of that, the indication could be dynamic or static.

Figure 7:
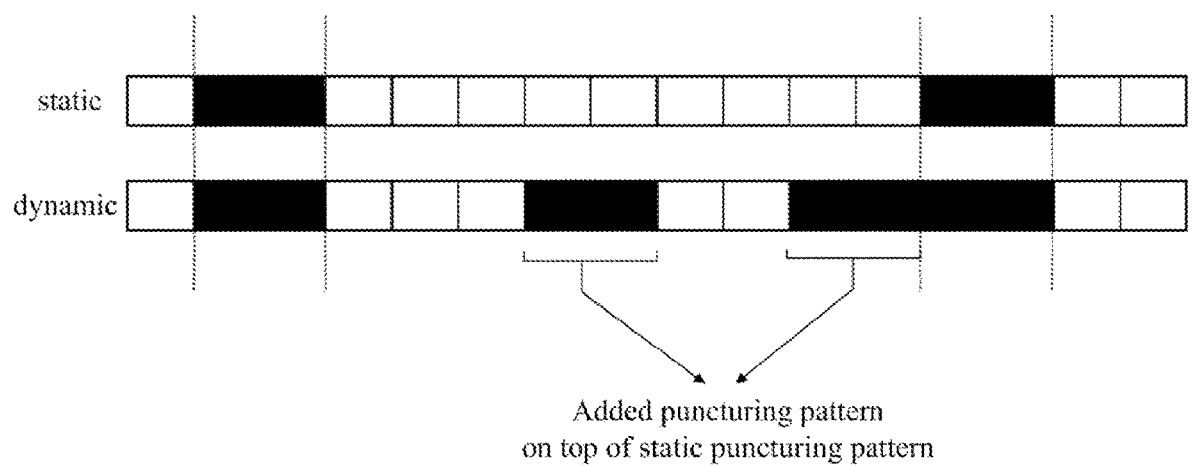
FIG. 7 illustrates different types of puncturing channel indication according to an embodiment of the present disclosure.

FIG. 7 illustrates different types of puncturing channel indication according to an embodiment of the present disclosure.

Referring to FIG. 7, a static puncturing channel indication is likely to reflect the local regulation and channel characteristics which do not allow some specific channels for the BSS. It means at least those channels are likely to be punctured for a relatively long time. For example, the static puncturing channel indication could be provided with the EHT Operation element as shown in FIG. 8 below wherein this element could be carried in a management frame such as a beacon frame. Once the management frame including the static puncturing channel indication is received, the puncturing pattern for the static puncturing channel indication could be used unless additional indication (e.g., the dynamic puncturing channel indication or another static puncturing channel indication) is not correctly received. On the other hand, the dynamic puncturing indication could be dynamically updated in accordance with the channel measurement depending on the circumstances. For example, the dynamic puncturing indication should contain the static puncturing pattern.

FIG. 8 illustrates an example of the EHT Operation element according to an embodiment of the present disclosure. A (a) of FIG. 8 is an example of the EHT Operation element format, a (b) of FIG. 8 is an example of EHT Operation Parameters field format, and a (c) of FIG. 8 is an example of EHT Operation Information format.

Referring to FIG. 8, the format of the EHT Operation element 800 includes Element ID field 801, Length field 802, Element ID Extension field 803, EHT Operation Parameters field 804, Basic EHT-MCS And Nss Set field 805, and EHT Operation Information field 806. The EHT Operation element is identified by the Element ID field 801 and, if present, the Element ID Extension field 803. The Length field 802 indicates the number of octets in the EHT Operation element excluding the Element ID field 801 and the Length field 802. The EHT Operation Parameters field 804 includes EHT Operation Information Present subfield 804-1, Disabled Subchannel Bitmap Present subfield 804-2, EHT Default PE Duration subfield 804-3, Group Addressed BU Indication Limit subfield 804-4, Group Addressed BU Indication Exponent subfield 804-5, and Reserved subfield 804-6. The Basic EHT-MCS And NSS Set field 805 indicates the EHT-MCSs for each number of spatial streams in EHT PPDUs that are supported by all EHT STAs in the BSS in transmit and receive. The EHT Operation Information field 806 includes Control subfield 806-1, channel center frequency segment 0(CCFS0) subfield 806-2, CCFS1 subfield 806-3, and Disabled Subchannel Bitmap subfield 806-4. The Control subfield 806-1 of the EHT Operation Information field 806 includes Channel Width subfield 807 and Reserved subfield 808. The EHT Operation Information Present subfield 804-1 is set to 1 if the EHT Operation Information field 806 is present and set to 0 otherwise. The EHT Operation Information Present subfield 804-1 is set to 1 if the channel width indicated in an HT Operation, VHT Operation, or HE Operation element that is present in the same Management frame is different from the Channel Width subfield 807 indicated in the EHT Operation Information field 806. The Disabled Subchannel Bitmap Present subfield 804-2 is set to 1 if the Disabled Subchannel Bitmap subfield 806-4 indicated in the EHT Operation Information field 806 is present and set to 0 otherwise. The Disabled Subchannel Bitmap Present subfield 804-2 is valid only when the HT Operation Information Present subfield is set to 1. The EHT Default PE Duration subfield 804-3 is set to 1 to indicate that the PE field duration for an EHT TB PPDU solicited by a TRS Control subfield is 20 µs and set to 0 to indicate that the PE field duration is the same as that indicated in the HE Operation Parameters field in the HE Operation element. The Group Addressed BU Indication Limit subfield 804-4 indicates whether there is a limit on the number of bits to indicate the presence of buffered group addressed frames of all other APs affiliated with the same AP MLDs as all nontransmitted BSSIDs in a multiple BSSID set in the TIM element or not. The Group Addressed BU Indication Limit subfield 804-4 is set to 0 if one of the conditions is met: (i) the AP is not in multiple BSSID set, (ii) the AP is in multiple BSSID set and the total number of bits needed to indicate the presence of buffered group addressed frames of all other Aps affiliated with the same AP multi-link devices (MLDs) as all nontransmitted BSSID in the traffic indication map (TIM) element is not greater than 48 bits. Otherwise, the Group Addressed BU Indication Limit subfield 804-4 is set to 1. The Group Addressed BU Indication Exponent subfield 804-5 is set to the exponent from which N is calculated. The EHT Operation Information field 806 is present if the EHT Operation Information Present subfield 804-1 is equal to 1; otherwise the EHT Operation Information field 806 is not present. The EHT STA obtains the channel configuration information from the EHT Operation Information field 806, if present, in the EHT Operation element 800. The Channel Width subfield 807, CCFS0 subfield 806-2, and CCFS1 subfield 806-3 are defined in Table 4 and Table 5. The Disabled Subchannel Bitmap subfield 806-4 is present if the Disabled Subchannel Bitmap Present subfield 804-2 is equal to 1 and provides a list of subchannels that are punctured within the BSS bandwidth, otherwise the Disabled Subchannel Bitmap Present subfield 804-2 is not present. The Disabled Subchannel Bitmap subfield 806-4 is a 16-bit bitmap where the lowest numbered bit corresponds to the 20 MHz subchannel that lies within the BSS bandwidth and that has the lowest frequency of the set of all 20 MHz subchannels within the BSS bandwidth. Each successive bit in the bitmap corresponds to the next higher frequency 20 MHz subchannel. A bit in the bitmap is set to 1 to indicate that the corresponding 20 MHz subchannel is punctured and is set to 0 to indicate that the corresponding 20 MHz subchannel is not punctured.

decode the preamble on primary 20 MHz subchannel first to get the control information (e.g. bandwidth information) from SIG field to decode further the rest portion of the PPDU, 11ax STAs are likely to stay at least within primary 80 MHz channel (or the primary 160 MHz channel). To increase the efficiency, a new mechanism could be introduced. For example, the new mechanism enables multiplexing of EHT STAs with different amendment compliant devices such as 11ax or beyond EHT STAs (EHT+STAs).

Figure 9:
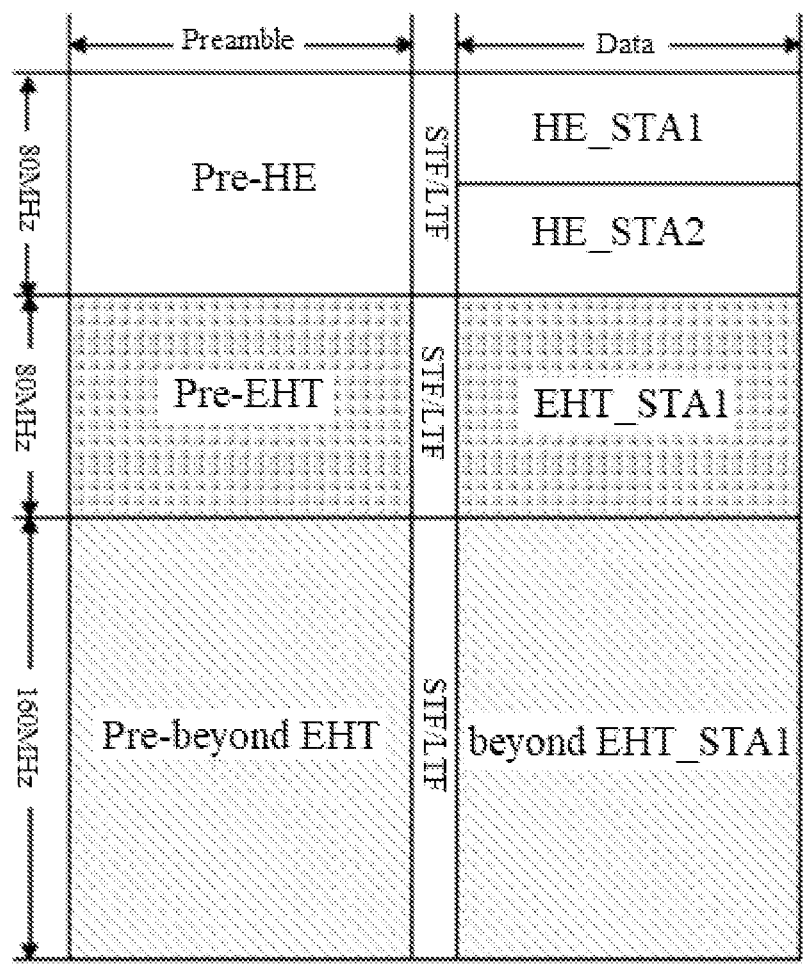
FIG. 9 illustrates an example of A-PPDU transmission according to an embodiment of the present disclosure.

FIG. 9 illustrates an example of A-PPDU transmission according to an embodiment of the present disclosure.

Referring to FIG. 9, A (aggregated)-PPDU includes multiple sub-PPDUs. The pre-HE, pre-EHT, and pre-beyond EHT denote the preamble parts of sub-PPDUs for three different amendments, i.e., HE, EHT, and beyond EHT, respectively. Each sub-PPDU could occupy non-overlapping of frequency segments where the sub-PPDUs are orthogonal in frequency domain symbol-by-symbol. A-PPDU transmission could be transmitted in both downlink and uplink. Hereafter, once this present disclosure describes those certain features are supported for EHT devices, it could be applicable for beyond EHT without any additional description.

TABLE 4

| Subfield | Definition | Encoding |
| --- | --- | --- |
| Channel Width | This subfield defines the EHT BSS bandwidth. | Set to 0 for 20 MHz EHT BSS bandwidth. Set to 1 for 40 MHz EHT BSS bandwidth. Set to 2 for 80 MHz EHT BSS bandwidth. Set to 3 for 160 MHz EHT BSS bandwidth. Set to 4 for 320 MHz EHT BSS bandwidth. Values in the ranges 5 to 7 are reserved. |
| CCFS0 | This subfield defines a channel center frequency for a 20, 40, 80, 160, or 320 MHz EHT BBS. | For 20, 40 or 80 MHz BSS bandwidth, indicates the channel center frequency index for the 20, 40 or 80 MHz channel on which the EHT BSS operates. For 160 MHz BSS bandwidth, indicates the channel center frequency index of the primary 80 MHz channel. For 320 MHz BSS bandwidth, indicates the channel center frequency index of the primary 160 MHz channel. |
| CCFS1 | This subfield defines a channel center frequency for a 160 or 320 MHz EHT BBS. | For a 20, 40 or 80 MHz BSS bandwidth, this subfield is set to 0. For a 160 MHz BSS bandwidth, indicates the channel center frequency index of the 160 MHz channel on which the EHT BSS operates. For a 320 MHz BSS bandwidth, indicates the channel center frequency index of the 320 MHz channel on which the EJT BSS operates. See Table 5 (EHT BSS channel width) |

TABLE 5

| Channel Width subfield | CCFS1 subfield | EHT BSS channel width (MHz) |
| --- | --- | --- |
| 0 | 0 | 20 |
| 1 | 0 | 40 |
| 2 | 0 | 80 |
| 3 | CCFS1 > 0 and |CCFS1-CCFS0| = 8 | 160 |
| 4 | CCFS1 > 0 and |CCFS1-CCFS0| = 16 | 320 |

Considering wider bandwidth such as 320 MHz channel bandwidth on 6 GHz, it might be hard for one STA to occupy entire bandwidth because of incumbent devices or previous amendment devices (e.g. 11ax compliant devices). For example, since 11ax STAs capable of 80/160 MHz operation The 11ax devices camp on the primary 80 MHz channel (or the primary 160 MHz channel) and fully reuse the 11ax processing procedure. In terms of the HE STAs, all flows should be transparent during the multiplexing period time. As for EHT and EHT+STAs, those STAs can figure out the new rules to be defined and process its own assigned portion correctly. The new structure and rule could contain the method that EHT and EHT+devices could camp on secondary channels. Without information on the primary 20 MHz subchannel or with the information previously being shared before this procedure based on SST (subchannel selective transmission) operation, those devices can work out. In order to support those new structure to multiplex different amendment STAs, there are several requirements such as consistent tone spacing between different amendment STAs, symbol alignment by the same tone spacing or the same GI values or same MCS for SIG portion or data portion between 80 MHz segments or 160 MHz segment depending on the STAs capable bandwidth.

The SST operation is introduced as one of flax capabilities. An HE AP shall not allocate an RU outside of the primary 80 MHz channel in a 160 MHz or 80+80 MHz HE MU or HE TB PPDU to an 80 MHz operating non-AP HE STA if the non-AP STA has set the HE Subchannel Selective Transmission Support subfield in the HE MAC Capabilities Information field in the HE Capabilities element to 0. An HE AP shall not allocate an RU outside of the primary 80 MHz subchannel in a 160 MHz or 80+80 MHz HE MU or HE TB PPDU to an 80 MHz operating non-AP HE STA if the non-AP STA has set the HE Subchannel Selective Transmission Support subfield in the HE MAC Capabilities Information field in the HE Capabilities element to 1 but has not set up SST operation on the secondary 80 MHz channel with the HE AP. The TXVECTOR parameter CH_BAND-WIDTH (e.g. Channel bandwidth information) of a DL MU PPDU is not set to HE-CBWPUNC160-PRI20, HE-CBW-PUNC80+80-PRI20, HE-CBW-PUNC160-SEC40 or HE-CBWPUNC80+80-SEC40 (e.g. punctured channel bandwidth defined in the bandwidth information in 11ax) if the DL MU PPDU is addressed to at least one HE SST non-AP STA that is an 80 MHz operating STA operating in a secondary subchannel. It means if capabilities allowed, non-punctured RU (contiguous 20, 40, or 80 MHz PPDU) could be assigned to the secondary 80 MHz channel within 160 MHz channel supported in SST operation in 11ax.

In order to support this new PPDU format as the A-PPDU transmission, while a new trigger frame for a new amendment should be transparent to HE STAs (or previous amendment compliant STAs), it also carries additional control information for EHT or EHT+STAs wherein some fields in the new trigger frame could be reinterpreted only for EHT STAs (or EHT+STAs). Depending on the capabilities, a first capable AP shall not transmit a Trigger frame that solicit both HE TB PPDUs and EHT TB PPDU together while a second capable AP transmits a Trigger frame that solicits both HE TB PPDUs and EHT TB PPDUs. The first capable APs and STAs can be used for release 1 (as R1 devices) and the second capable APs and STAs can be used for release 2 (as R2 devices) in this present disclosure.

The new Trigger frame carries the different Common Info fields and User Info fields depending on the HE variant format or EHT variant format to be solicited.

Figure 10A:
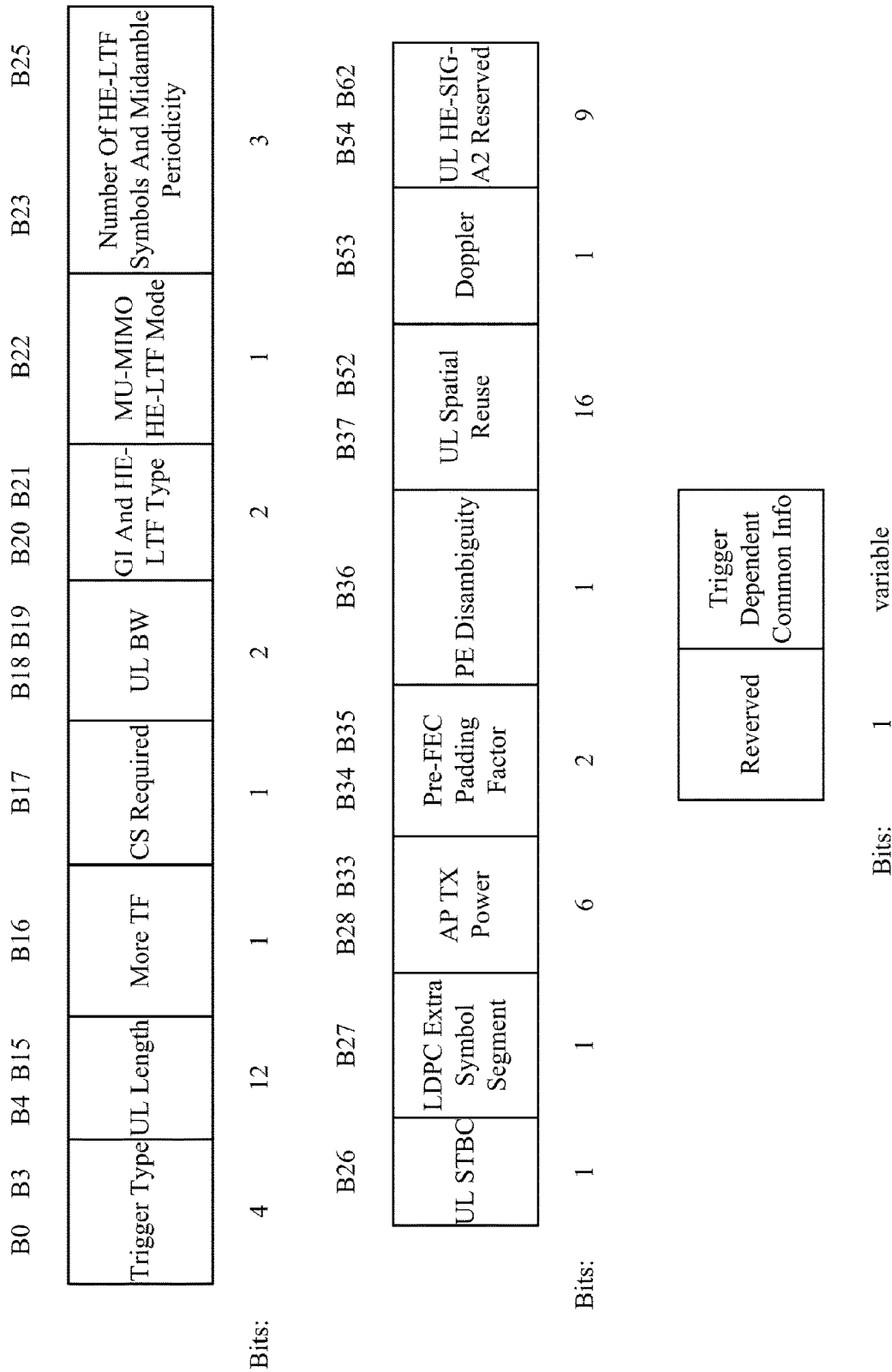

FIGS. 10A and 10B illustrate an example of the Common Info field in the new Trigger frame according to an embodiment of the present disclosure. A FIG. 10A is an example of Common Info field in 11ax and a FIG. 10B is an example of Common Info field in 11be.

Referring to FIGS. 10A and 10B, the UL HE-SIG-A2 Reserved subfield is set to all 1 s in 11ax (FIG. 10A) while B54 and B55 are assigned as common information for EHT STAs (FIG. 10B). B54, the HE/EHT P160 subfield indicates whether EHT STA to transmit an HE or EHT TB PPDU within the primary 160 MHz channel. The HE/EHT P160 subfield is set to 1 to carry HE TB PPDU and set to 0 to carry EHT TB PPDU. B55, the Special User Info Field Flag subfield, indicates whether EHT STA is present or not. The Special User Info Field Flag subfield is set to 1 to carry no Special User Info field, and set to 0 to carry the Special User Info field.

FIG. 11 illustrates an example of the User Info field in the new Trigger frame according to an embodiment of the present disclosure. A (a) of FIG. 11 is an example of User Info field in 11ax and a (b) of FIG. 11 is an example of User Info field in 11be.

Referring to FIG. 11, the new Trigger frame carries the different User Info field on the HE variant format or EHT variant format. For example, in 11be, RU Allocation subfield and B39, PS160 field, of User Info field are jointly encoded to indicate the location of RU and MRU assigned to each EHT STAs as shown in the Table 6.

TABLE 6

| PS160 subfield | B0 of theRU Allocation subfield | B7-B1 of the RU Allocation subfield | Bandwidth (MHz) | RU/MRU size | RU/MRU index | PHY RU/MRU index |
|---|---|---|---|---|---|---|
| 0-3: 80 MHz segment where the RU is located | | 0-8 | 20, 40, 80, 160, or 320 | 26 | RU1 to RU9, respectively | 37' N + RU index |
| | | 9-17 | 40, 80, 160, or 320 | | RU10 to RU18, respectively | |
| | | 18 | 80, 160, or 320 | | Reserved | |
| | | 19-36 | 80, 160, or 320 | | RU20 to RU37 respectively | |
| | | 37-40 | 20, 40, 80, 160, or 320 | 52 | RU1 to RU4, respectively | 16' N + RU index |
| | | 41-44 | 40, 80, 160, or 320 | | RU5 to RU8, respectively | |
| | | 45-52 | 80, 160, or 320 | | RU9 to RU16, respectively | |
| | | 53, 54 | 20, 40, 80, 160, or 320 | 106 | RU1 and RU2, respectively | 8' N + RU index |
| | | 55, 56 | 40, 80, 160, or 320 | | RU3 and RU4, respectively | |

TABLE 6-continued

| PS160 subfield | B0 of theRU Allocation subfield | B7-B1 of the RU Allocation subfield | Bandwidth (MHz) | RU/MRU size | RU/MRU index | PHY RU/MRU index |
|---|---|---|---|---|---|---|
| | | 57-60 | 80, 160, or 320 | | RU5 to RU8, respectively | |
| | | 61 | 20, 40, 80, 160, or 320 | 242 | RU1 | 4' N + RU |
| | | 62 | 40, 80, 160, or 320 | | RU2 | index |
| | | 63,64 | 80, 160, or 320 | | RU3 and RU4, respectively | |
| | | 65 | 40, 80, 160, or 320 | 484 | RU1 | 2' N + RU |
| | | 66 | 80, 160, or 320 | | RU2 | index |
| | | 67 | 80, 160, or 320 | 996 | RU1 | N + RU index |
| 0-1: 160 MHz segment where the RU is located | 0 1 | 68 | Reserved 160 or 320 | 2'996 | Reserved RU1 | Reserved X1 + RU index |
| 0 0 1 1 | 0 1 0 1 | 69 | Reserved 320 | 4'996 | RUI | Reserved RUI |
| 0-3: 80 MHz segment where the RU is located | | 70-72 | 20, 40, 80, 160, or 320 | 52 + 26 | MRUI to MRU3, respectively | 12'N + MRU index |
| | | 73-75 | 40, 80, 160, or 320 | 52 + 26 | MRU4 to MRU6, respectively | |
| | | 76-81 | 80, 160, or 320 | 52 + 26 | MRU7 to MRU12, respectively | |
| | | 82, 83 | 20, 40, 80, 160, or 320 | 106 + 26 | MRUI and MRU2, respectively | 8' N + MRU index |
| | | 84, 85 | 40, 80, 160, or 320 | 106 + 26 | MRU3 and MRU4, respectively | |
| | | 86-89 | 80, 160, or 320 | 106 + 26 | MRU5 to MRU8, respectively | |
| | | 90-93 | 80, 160, or 320 | 484 + 242 | MRU1 to MRU4, respectively | 4'N + MRU index |
| 0-1: 160 MHz segment where the MRU is located | 0 1 | 94, 95 | 160 or 320 | 996 + 484 | MRU1 and MRU2, respectively MRU3 and MRU4, respectively | 4'X1 + MRU index |
| 0-1: 160 MHz segment where the MRU is located | 0 1 | 96-99 | 160 or 320 | 996 + 484 + 242 | MRU1 to MRU4, respectively MRU5 to MRU8, respectively | 8'X1 + MRU index |
| 0 0 1 1 | 0 1 0 1 | 100-103 | 320 | 2'996 + 484 | MRU1 to MRU4, respectively MRU5 and MRU6, respectively MRU7 and MRU8, respectively MRU9 to MRU12, respectively | MRU index |

TABLE 6-continued

| PS160 subfield | B0 of theRU Allocation subfield | B7-B1 of the RU Allocation subfield | Bandwidth (MHz) | RU/MRU size | RU/MRU index | PHY RU/MRU index |
|---|---|---|---|---|---|---|
| 0 | 0 | 104 | 320 | 3'996 | MRU1 | MRU index |
| 0 | 1 | | | | MRU2 | |
| 1 | 0 | | | | MRU3 | |
| 1 | 1 | | | | MRU4 | |
| 0 | 0 | 105, 106 | 320 | 3'996 + 484 | MRU1 and MRU2, respectively | MRU index |
| 0 | 1 | | | | MRU3 and MRU4, respectively | |
| 1 | 0 | | | | MRU5 and MRU6, respectively | |
| 1 | 1 | | | | MRU7 and MRU8, respectively | |
| Any | Any | 107-127 | Any | Reserved | Reserved | Reserved |

NOTE
B0 of the RU Allocation subfield is set to 0 to indicate that the RU/MRU allocation applies to the primary 80 MHz channel and set to 1 to indicate that the RU allocation applies to the secondary 80 MHz channel in the primary 160 MHz channel. B0 of the RU Allocation subfield is set to 0 to indicate that the RU/MRU allocation applies to the lower 80 MHz channel in the secondary 160 MHz channel and is set to 1 to indicate that the RU allocation applies to upper 80 MHz channel in the secondary 160 MHz channel.

Figure 12:
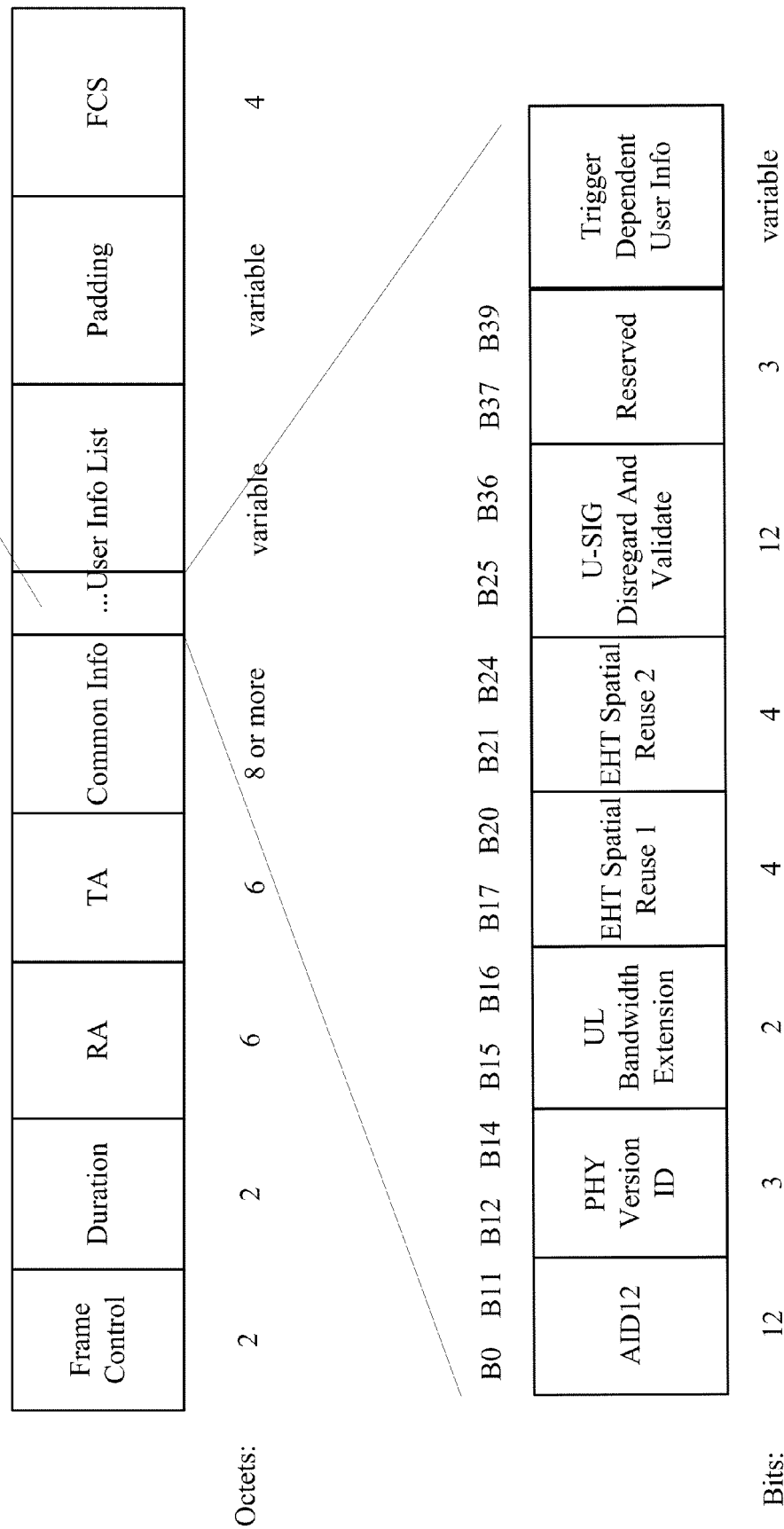
FIG. 12 illustrates an example of Special User Info field according to an embodiment of the present disclosure.

FIG. 12 illustrates an example of Special User Info field according to an embodiment of the present disclosure.

Referring to FIG. 12, the Special User Info field, if present, is located immediately after Common Info field in the new Trigger frame. The Special User Info field is a User Info field that does not carry the user specific information but carries the additional common information not provided in the Common Info field. The Special User Info field is identified by the AID12 value of 2007 which is not assigned to EHT STAs (still allowed as AID for 11ax STAs). The PHY Version ID subfield in the Special User Info field is set to 0 for EHT STAs.

In case 160 MHz channel bandwidth indicated in U-SIG of 20/40/80/160 MHz MU PPDU for A-PPDU transmission, it is transparent like MU PPDU of non-A-PPDU transmission. In case 320 MHz channel bandwidth indicated in U-SIG of MU PPDU for A-PPDU transmission, since there is no way to indicate whether primary 160 MHz channel is punctured in U-SIG, this case might not get along if keeping puncturing pattern being limited to each 80 MHz subchannel. Moreover, current puncturing pattern of 1111, 0111, 1011, 1101, 1110, 0011, 1100, and 1001 does not support this 80 MHz subchannel is punctured out.

In terms of A-PPDU transmission operation, there is a need to consider how to signal the puncturing information indicating which 20 MHz subchannel is not punctured for the operation on non-primary 80 MHz channel (or non-primary 160 MHz channel) for OFDMA and non-OFDMA transmission.

For non-OFDMA transmission case, at least one 20 MHz subchannel should be known within on the secondary subchannels. For example, one 20 MHz subchannel should be known within the secondary 160 MHz channel.

For OFDMA transmission case, at least one 20 MHz subchannel should be known within each 80 MHz subchannel on the secondary subchannels. For example, each 20 MHz subchannel for two 80 MHz subchannels should be known on the secondary 160 MHz channel.

The puncturing information could be in the different ways as below.

The parameter INACTIVE_SUBCHANNELS to indicate which 20 MHz subchannels are punctured.
  defined to be set by MAC through TXVECTOR parameters Operation element wherein this element could be carried in Beacon frame. Once it is received, this puncturing pattern could be used unless additional indication (e.g. the dynamic puncturing channel indication or another static puncturing channel indication) is not correctly received.

Puncturing information could be static or dynamic.
Recently received puncturing information should be used.
There is a sounding protocol sequence as defined with the frame exchange sequences for non-TB sounding sequence (for single user transmission) and TB sounding sequence (for multiple user transmission) as shown in FIG.13 below.

Figure 13:
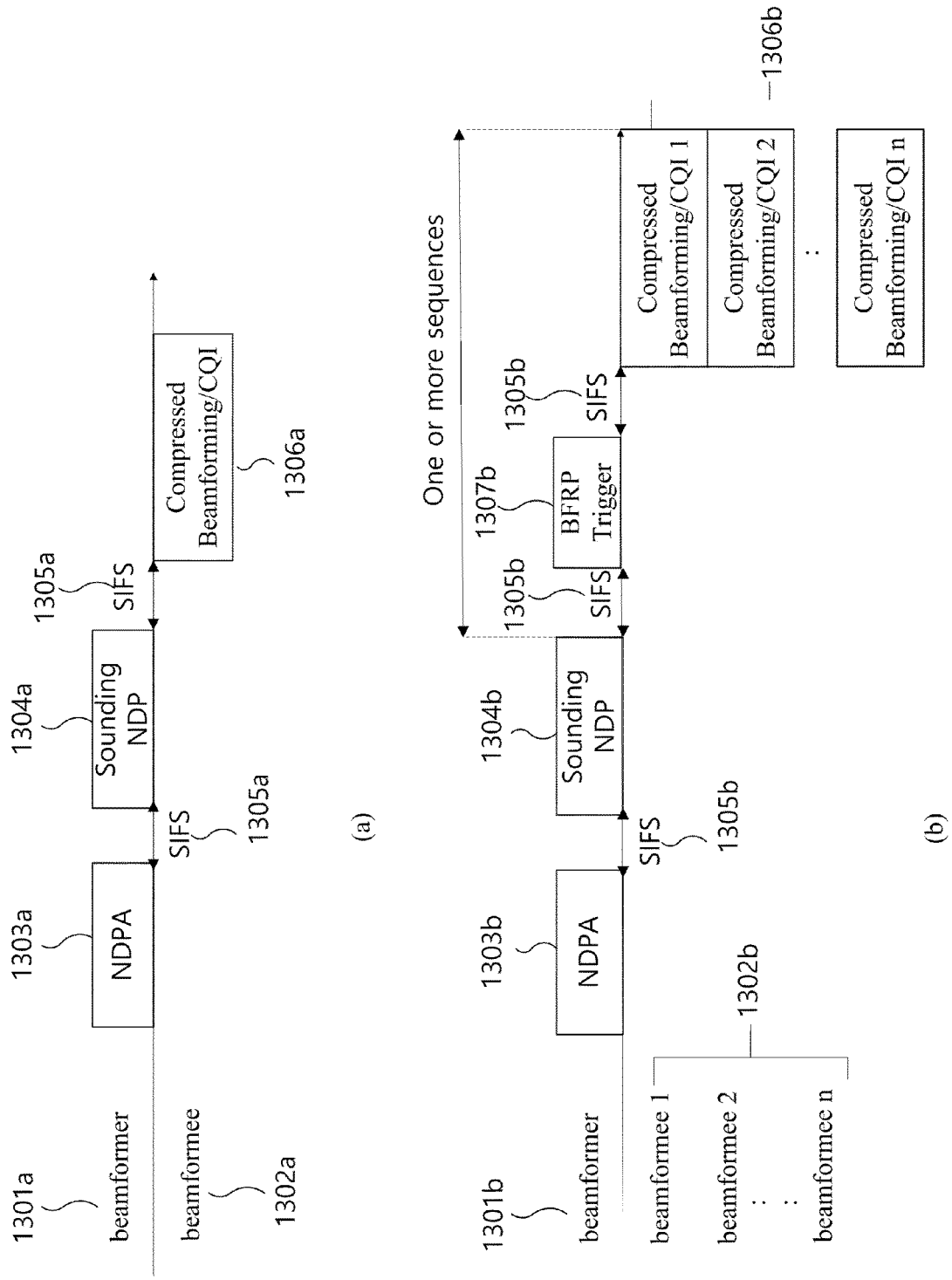
FIG. 13 illustrates an example of a sounding protocol sequence according to an embodiment of the present disclosure.

FIG. 13 illustrates a sounding protocol sequence according to an embodiment of the present disclosure. A (a) of FIG. 13 is an example of a non-TB sounding sequence and a (b) of FIG. 13 is an example of a TB sounding sequence.

Referring to (a) of FIG. 13, the beamformed transmission is initiated with a NDP Announcement frame 1303a by the beamformer 1301a. After SIFS 1305a interval, the NDP frame 1304a is transmitted to be estimated for channel matrix by the beamformee 1302a and beamformee 1302a calculates the beam matrix. After SIFS 1305a interval, Compressed Beamforming/channel quality indicator (CQI) frame 1306a including feedback information is sent by the beamformee 1302a. NDP Announcement frame 1303a contains proper signaling to help this procedure for the STA wherein the STA ID is included in NDP Announcement frame 1303a.

Referring to (b) of FIG. 13, the beamformed transmission is initiated with a NDP Announcement frame 1303b by the beamformer 1301b. After SIFS 1305b interval, the NDP frame 1304b is transmitted to be estimated for channel matrix by the beamformees 1302b (beamformee 1, beamformee 2, . . . beamformee n) and beamformees 1302b calculate the beam matrix. After SIFS 1305b, the beamforming report poll (BFRP) Trigger frames 1307b followed by Compressed Beamforming/CQI frames 1306b (Compressed Beamforming/CQI frame 1, Compressed Beamforming/CQI frame 2, . . . Compressed Beamforming/CQI frame n) from a plurality of beamformees 1302b are exchanged one or more times. NDP Announcement frame 1303b contains proper signaling to help this procedure for some STAs wherein the STA ID is included in NDP Announcement frame 1303b.

Figure 14:
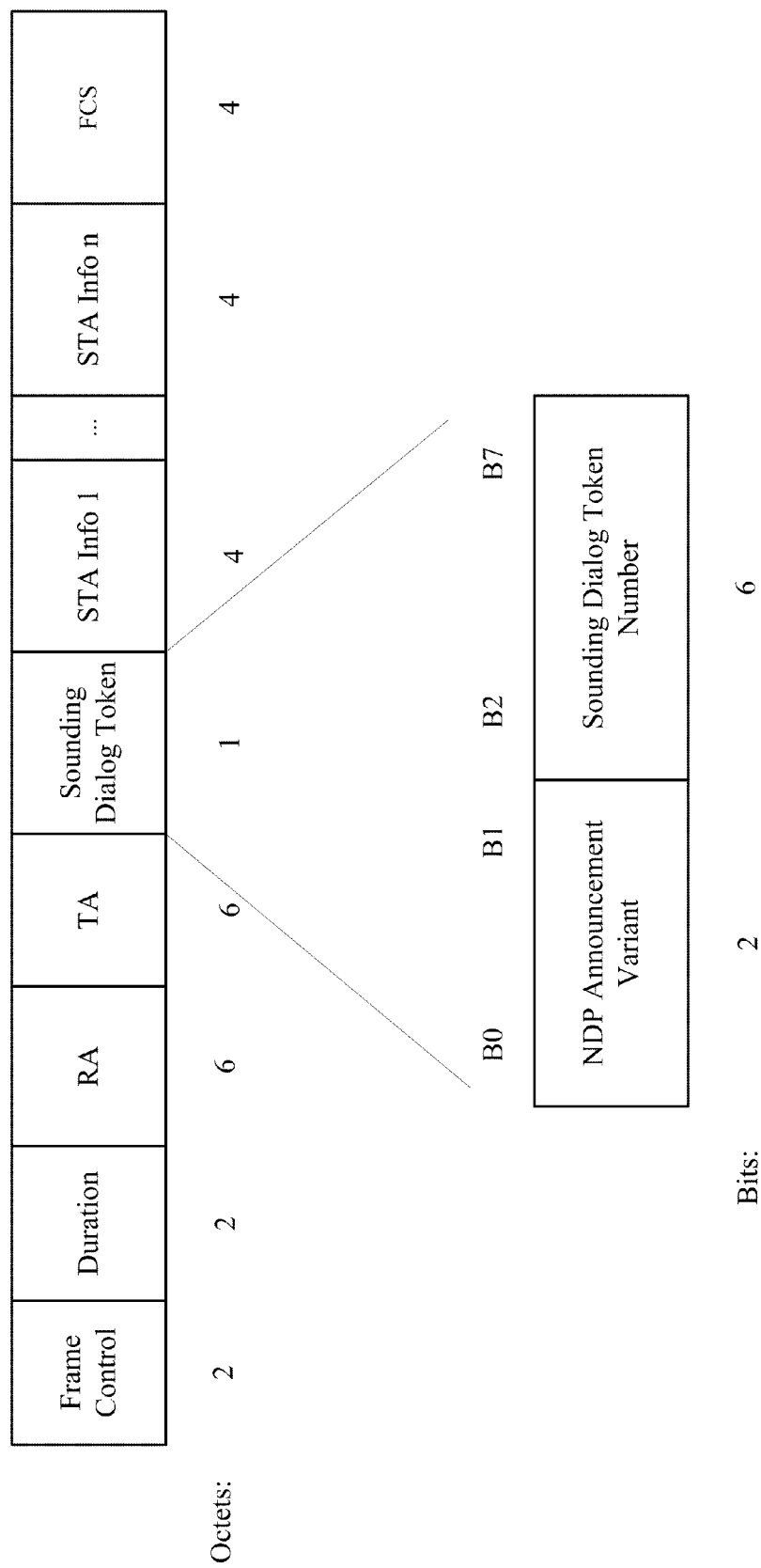
FIG. 14 illustrates an example of the Sounding Dialog Token field in the NDP Announcement frame according to an embodiment of the present disclosure.

The NDP Announcement frame has four variants, which includes the VHT NDP Announcement frame, the HE NDP Announcement frame, the Ranging NDP Announcement frame, and the EHT NDP Announcement frame depending on the NDP Announcement Variant subfield in the Sounding Dialog Token field in FIG. 14.

FIG. 14 illustrates an example of the Sounding Dialog Token field in the NDP Announcement frame according to an embodiment of the present disclosure.

Referring to FIG. 14, the Sounding Dialog Token field in the NDP Announcement frame includes the NDP Announcement Variant subfield and the Sounding Dialog Token Number field. The setting of the NDP Announcement Variant subfield in the Sounding Dialog Token field identifies the variant of the NDP Announcement frame as shown in Table 7. For example, B1 and B0 of the NDP Announcement Variant subfield in the Sounding Dialog Token field are set to 0 to identify the frame as a VHT NDP Announcement frame; B1 and B0 of the NDP Announcement Variant subfield in the Sounding Dialog Token field are set to 1 and 0 respectively to identify the frame as an HE NDP Announcement frame; B1 and B0 of the NDP Announcement Variant subfield in the Sounding Dialog Token field are set to 0 and 1 respectively to identify the frame as an Ranging NDP Announcement frame; and B1 and B0 of the NDP Announcement Variant subfield in the Sounding Dialog Token field are set to 1 to identify the frame as a an EHT NDP Announcement frame. The Sounding Dialog Token Number field in the Sounding Dialog Token field includes a value selected by the beamformer (e.g. AP) to identify the corresponding NDP Announcement frame. For example, in case that a value of the NDP Announcement Variant subfield in the Sounding Dialog Token field is set to 3(EHT NDP Announcement frame), the Sounding Dialog Token Number field in the Sounding Dialog Token field includes a value selected by the beamformer (e.g. AP) to identify the EHT NDP Announcement frame.

TABLE 7

NDP Announcement Variant subfield

| B1 | B0 | NDP Announcement frame variant |
|---|---|---|
| 0 | 0 | VHT NDP Announcement frame |
| 0 | 1 | Ranging NDP Announcement frame |
| 1 | 0 | HE NDP Announcement frame |
| 1 | 1 | EHT NDP Announcement frame |

In legacy 11be, the EHT NDP Announcement frame includes at most one STA Info field per STA. The EHT NDP Announcement frame does not include a STA Info field with the AID11 subfield larger than 2047. The AID11 subfield encoding in NDP Announcement frame in legacy 11be is defined in Table 8.

TABLE 8

| AID subfield | Description | NDP Announcement frame variant applicability |
|---|---|---|
| 0 | STA Info field is addressed to the associated AP | Applicable to any variant |
| 1-2007 | STA Info field is addressed to an associated STA whose AID is equal to the value in the AID11 subfield if the NDP Announcement frame is not a Ranging variant. STA Info field is addressed to an unassociated STA or an associated STA whose RSID/AID is equal to the value in the RSID11/AID11 subfield if the NDP Announcement frame is a Ranging variant. | Applicable to any variant |
| 2008-2042 | Reserved | Not applicable to any variant |
| 2043 | STA Info field contains a sequence authentication code if the NDP Announcement frame is a Ranging variant. This AID11 value is reserved otherwise. | Applicable to any variant |
| 2044 | STA Info field contains a partial TSF if the NDP Announcement frame is a Ranging variant. The AID11 value is reserved otherwise. | Applicable to any variant |
| 2045 | STA Info field contains ranging measurement parameters if the NDP Announcement frame is a Ranging variant. This AID11 value is reserved otherwise. | Applicable to any variant |
| 2046 | Reserved | Not applicable to any variant |
| 2047 | STA Info field contains a disallowed subfield bitmap if the NDP Announcement frame is an HE variant. This AID II value is reserved otherwise. | Applicable to any variant |

However, regardless of definition above, when the EHT AP transmits the EHT NDP Announcement frame and the EHT NDP frame followed by the Trigger frame to solicit Beamforming/CQI feedback information from STAs wherein the STAs are signaled in the AID12 subfield in EHT variant User Info field, since the Special User Info field is identified by the AID12 value of 2007 and is optionally present in the Trigger frame that is generated by the EHT AP, the EHT AP does not use the value 2007 as an AID for any STA associated to it.

Therefore, it could be determined to use the value 2007 as an AID for any STA associated to it depending on whether it is non-TB sounding sequence or TB sounding sequence as below.

TB sounding sequence for multiple users.
  It includes the Trigger frame which contains Special User Info field with AID 2007.
  EHT AP does not use the value 2007 as an AID for any STA associated to it.
  The values 1-2006 are assigned as AIDs and value 2007 is reserved.
Non-TB sounding sequence for single user.
  It does not include the Trigger frame.
  EHT AP could assign the value 2007 as an AID for any STA associated to it.
  The values 1-2007 are assigned as AIDs.

With the same value (=2007) of AID subfield used for different purpose, this causes the discrepancy between STA Info field in the EHT NDP Announcement frame and the EHT variant User Info field in the Trigger frame in legacy 11be. Therefore, there is a need to update Table 8 as Table 9 below. It means value 1 to 2006 could be assigned for EHT STAs as AID12 subfield in EHT variant User Info field and value 2007 should be reserved for VHT and HE variant User Info field.

following properties: (i) the HE Sounding NDP uses the HE SU PPDU format without the Data field, (ii) the HE Sounding NDP has PE field with 4 μs in duration. The HE Sounding NDP overlapping the 242-tone RUs corresponding to bits with a value of 1 in the bitmap of the TXVECTOR parameter INACTIVE_SUBCHANNELS or overlapping a punctured center 26-tone RU of an HE Sounding NDP are punctured. The center 26-tone RU of the HE Sounding NDP is punctured if either one of the adjacent 242-tone RUs is punctured.

It is mandatory to support the 2×HE-LTF with 0.8 μs GI and 2×HE-LTF with 1.6 μs GI. It is optional to support the 4×HE-LTF with 3.2 μs GI. The other combinations of HE-LTF type and GI duration are disallowed.

If the Beamformed field in HE-SIG-A of an HE Sounding NDP is 1, then the receiver of the HE Sounding NDP should not perform channel smoothing when generating the compressed beamforming feedback report.

Figure 15:
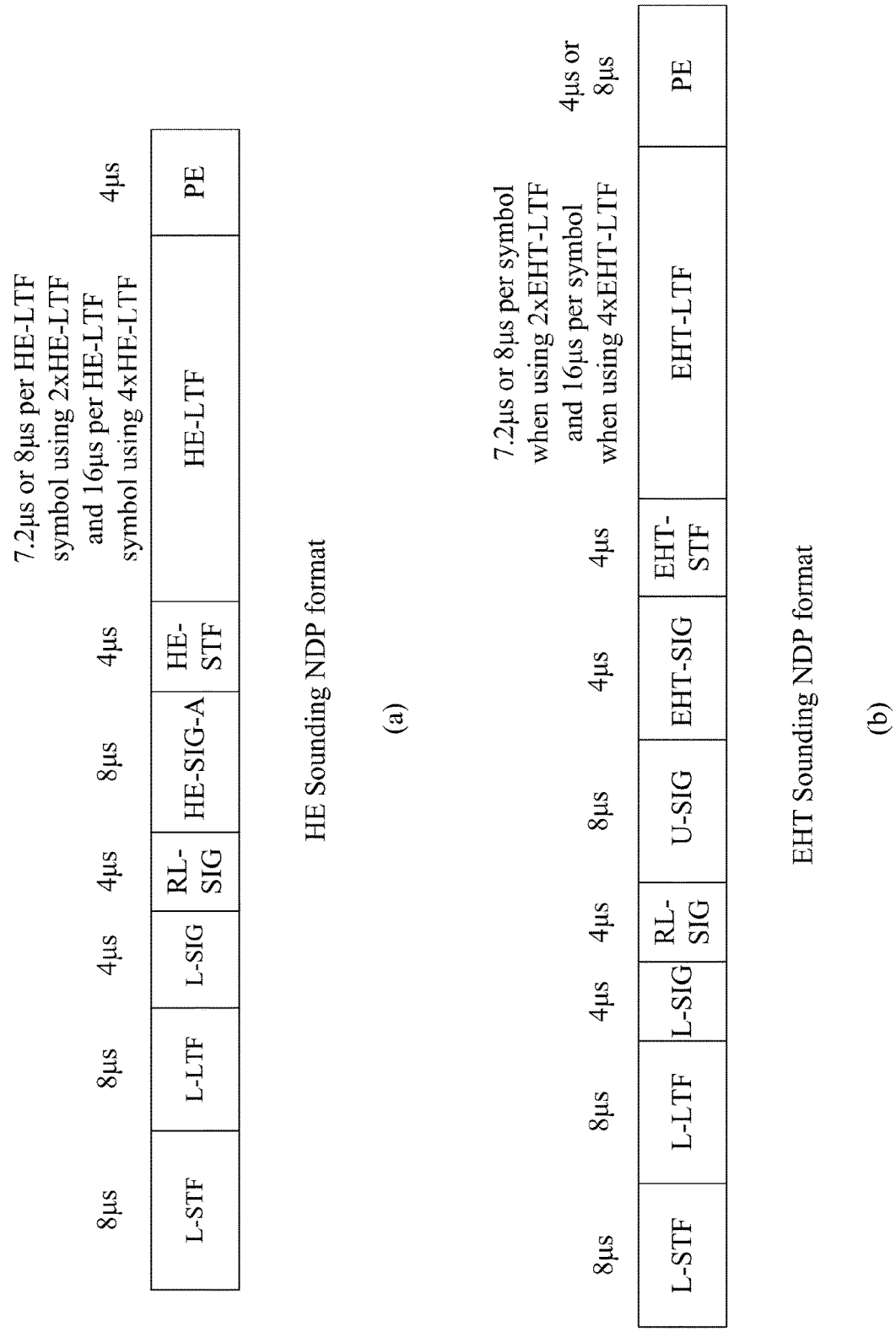
FIG. 15 illustrates an example of different types of Sounding NDP format according to an embodiment of the present disclosure.

Referring to (b) of FIG. 15, the EHT Sounding NDP is a variant of the EHT MU PPDU. If the PPDU Type And Compression Mode field is set to 1, the EHT-SIG MCS field is set to 0 and the Number Of EHT-SIG Symbols field is set to 0, it indicates an EHT Sounding NDP. The EHT Sounding NDP has the following properties: (i) the EHT Sounding NDP uses the EHT MU PPDU format without the Data field, (ii) the EHT Sounding NDP uses the EHT MU PPDU with a single EHT-SIG symbol encoded using EHT-MCS 0, (iii) EHT Sounding NDP has PE field with 4 μs when the PPDU

TABLE 9

| AID subfield | Description | NDP Announcement frame variant applicability |
|---|---|---|
| 0 | STA Info field is addressed to the associated AP | Applicable to any variant |
| 1-2007 | STA Info field is addressed to an associated STA whose AID is equal to the value in the AID11 subfield if the NDP Announcement frame is not a Ranging variant.<br>STA Info field is addressed to an unassociated STA or an associated STA whose RSID/AID is equal to the value in the RSID11/AID11 subfield if the NDP Announcement frame is a Ranging variant. | Applicable to any variant except EHT variant assigned for any STAs associated to the EHT AP during TB sounding sequence.<br>Note: If the AID 12 subfield is 2007 and the Trigger frame containing this User Info field is generated by an EHT AP. It is a Special User Info field. |
| 2008-2042 | Reserved | Not applicable to any variant |
| 2043 | STA Info field contains a sequence authentication code if the NDP Announcement frame is a Ranging variant.<br>This AID11 value is reserved otherwise. | Applicable to any variant |
| 2044 | STA Info field contains a partial TSF if the NDP Announcement frame is a Ranging variant.<br>The AID11 value is reserved otherwise. | Applicable to any variant |
| 2045 | STA Info field contains ranging measurement parameters if the NDP Announcement frame is a Ranging variant.<br>This AID11 value is reserved otherwise. | Applicable to any variant |
| 2046 | Reserved | Not applicable to any variant |
| 2047 | STA Info field contains a disallowed subfield bitmap if the NDP Announcement frame is an HE variant.<br>This AID11 value is reserved otherwise. | Applicable to any variant |

FIG. 15 illustrates an example of different types of Sounding NDP format according to an embodiment of the present disclosure. A (a) of FIG. 15 is an example of HE Sounding NDP and a (b) of FIG. 15 is an example of EHT Sounding NDP.

Referring to (a) of FIG. 15, the HE Sounding NDP is a variant of the HE SU PPDU. The HE Sounding NDP has the bandwidth is less than or equal to 160 MHz and the number of spatial stream is less than or equal to 8, or with 8 μs for all the other cases. In the EHT Sounding NDP, the 242-tone RUs overlapping the 20 MHz channels that are signaled as punctured through the Punctured Channel Indication field of the U-SIG field are punctured. The allowed punctured patterns are given in Table 3 above.

It is mandatory to support the 2×EHT-LTF with 0.8 µs GI and 2×EHT-LTF with 1.6 µs GI. It is optional to support the 4×EHT-LTF with 3.2 µs GI. The other combinations of EHT-LTF type and GI duration are disallowed.

If the Beamformed subfield in EHT-SIG of an EHT Sounding NDP is 1, then the receiver of the EHT Sounding NDP should not perform channel smoothing when generating the compressed beamforming feedback report.

Figure 16:
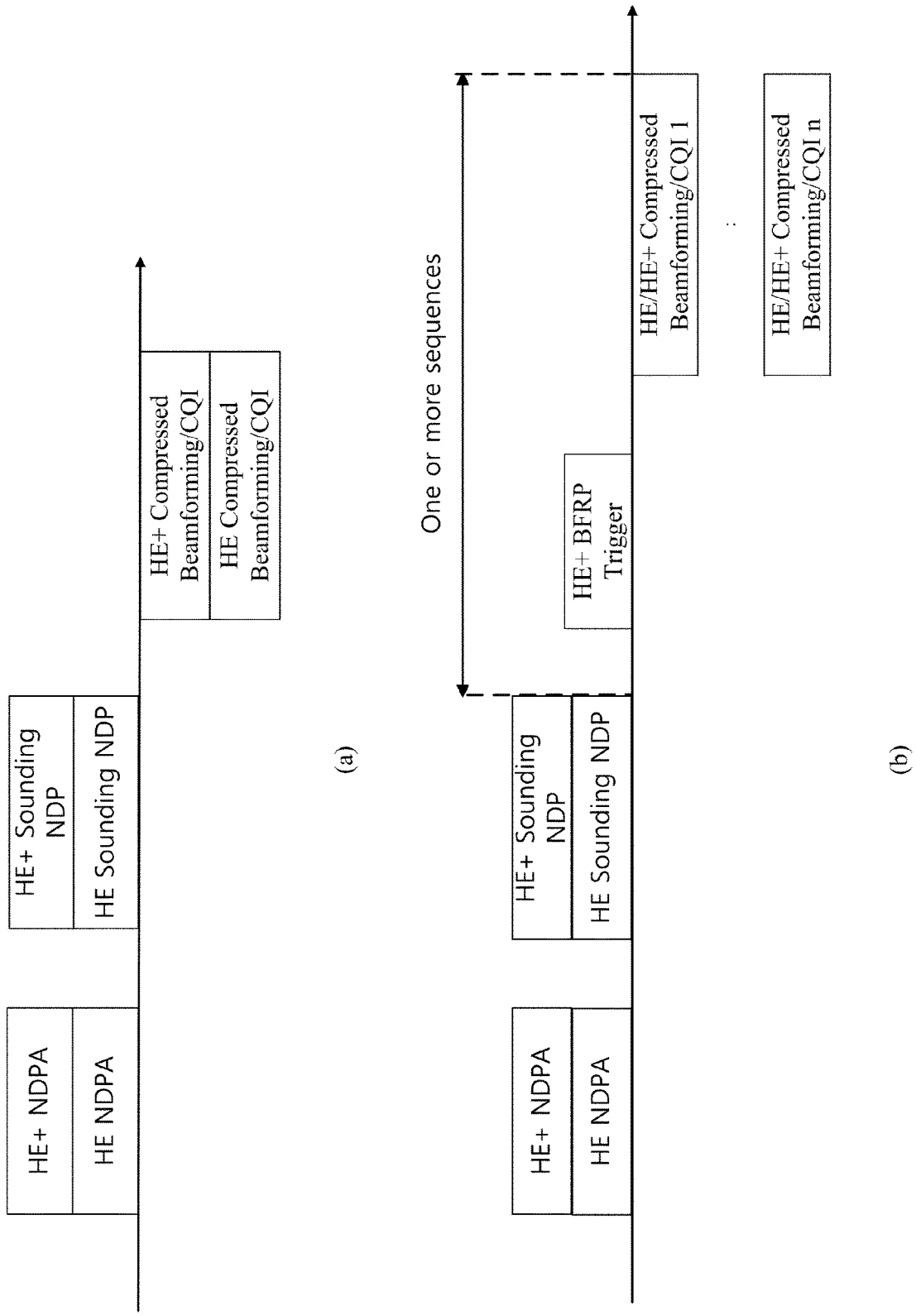
FIG. 16 illustrates an example of a sounding protocol sequence for A-PPDU transmission according to an embodiment of the present disclosure.

FIG. 16 illustrates an example of a sounding protocol sequence for A-PPDU transmission according to an embodiment of the present disclosure. A (a) of FIG. 16 is an example of a non-TB sounding protocol sequence using A-PPDU transmission and a (b) of FIG. 16 is an example of a TB sounding protocol sequence using A-PPDU transmission.

Referring to (a) of FIG. 16, the non-TB sounding protocol sequence for A-PPDU transmission starts with HE/beyond HE (HE+)(e.g. EHT) NDP Announcement frames (or EHT/EHT+NDP Announcement frames) in A-PPDU transmission followed by HE/HE+ Sounding NDPs (or EHT/EHT+ Sounding NDPs) for both HE STAs and HE+STAs. Here, the HE/HE+ NDP Announcement frames (or EHT/EHT+ NDP Announcement frames) are targeted to HE/HE+STAs (or EHT/EHT+STAs), respectively. The duration of inter PPDUs could be SIFS.

Referring to (b) of FIG. 16, once assuming at least one HE TB PPDU solicited, the TB sounding protocol sequence for A-PPDU transmission starts with HE/beyond HE (HE+)(e.g. EHT) NDP Announcement frames (or EHT/EHT+NDP Announcement frames) in A-PPDU transmission followed by HE/HE+ Sounding NDPs (or EHT/EHT+ Sounding NDPs) for both HE STAs and HE+STAs. Here, the HE/HE+ NDP Announcement frames (or EHT/EHT+NDP Announcement frames) are targeted to HE/HE+STAs (or EHT/EHT+STAs), respectively. In the TB sounding protocol sequence, HE+BFRP Trigger frame is one of Trigger frames supporting some specific Special User Info field wherein it allows HE/HE+STAs (or EHT/EHT+STAs) to be solicited to transmit TB PPDUs in A-PPDU transmission. The duration of inter PPDUs could be SIFS.

Considering the sounding protocol sequence for A-PPDU transmission as shown in FIG. 16, since the HE/HE+NDP Announcement frames (or the EHT/EHT+NDP Announcement frames) could be derived from the same NDP Announcement frame format as shown in FIG. 14, when the HE/HE+NDP Announcement frames (or the EHT/EHT+ NDP Announcement frames) are transmitted in A-PPDU transmission, it could meet the alignment between them. However, in Sounding NDP cases, since the HE/HE+ Sounding NDPs (or the EHT/EHT+ Sounding NDPs) might be derived from different types of Sounding NDP format as shown in FIG. 15, when the HE/HE+ Sounding NDPs (or the EHT/EHT+ Sounding NDPs) are transmitted in A-PPDU transmission, it might meet the mis-alinement between them. For example, given EHT-SIG field and/or PE field with 8 µs in EHT NDP Sounding, the mis-alinement between the HE Sounding NDP and the EHT Sounding NDP (or any different Sounding NDP formats in different amendments in WLAN are applicable for this present disclosure) could make the decoding procedures complicated.

Therefore, to resolve related issues, HE/HE+STAs (or EHT/EHT+STAs) could expect only one type of Sounding NDP format during the sounding protocol sequence for A-PPDU transmission wherein this Sounding NDP format should be applicable to all the different types of STAs.

Figure 17:
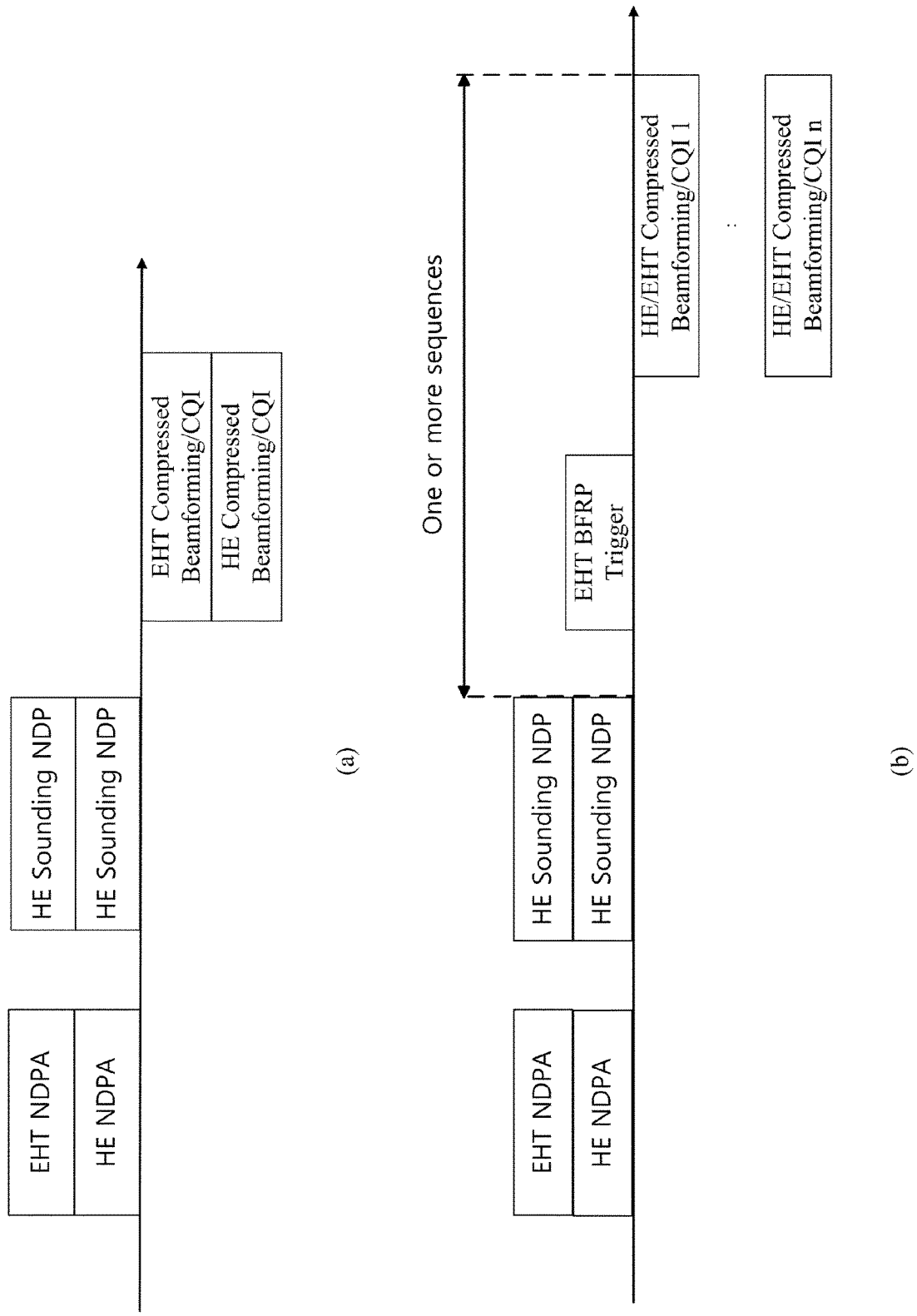
FIG. 17 illustrates an example of a sounding protocol sequence for A-PPDU transmission when recipients are HE STAs and EHT STAs (or EHT+STAs) according to an embodiment of the present disclosure.

FIG. 17 illustrates an example of a sounding protocol sequence for A-PPDU transmission when recipients are HE STAs and EHT STAs (or EHT+STAs) according to an embodiment of the present disclosure. A (a) of FIG. 17 is an example of a non-TB sounding protocol sequence using A-PPDU transmission when the recipients are HE STAs and EHT STAs (or EHT+STAs) and a (b) of FIG. 17 is an example of a TB sounding protocol sequence using A-PPDU transmission when the recipients are HE STAs and EHT STAs (or EHT+STAs).

Referring to (a) of FIG. 17, the non-TB sounding protocol sequence for A-PPDU transmission starts with HE NDP Announcement frame and EHT NDP Announcement frame in A-PPDU transmission followed by at least one HE Sounding NDP for both HE STAs and EHT STAs. For example, it could be in A-PPDU transmission such as two HE Sounding NDPs consisting of A-PPDU transmission. For another example, it could be one HE Sounding NDP transmission covering all bandwidth assigned for HE STAs and EHT STAs. Here, the HE NDP Announcement frame and the EHT NDP Announcement frame are targeted to HE STAs and EHT STAs, respectively. The duration of inter PPDUs could be SIFS.

Referring to (b) of FIG. 17, once assuming at least one HE TB PPDU solicited, the TB sounding protocol sequence for A-PPDU transmission starts with HE NDP Announcement frame and EHT NDP Announcement frame in A-PPDU transmission followed by at least one HE Sounding NDP for both HE STAs and EHT STAs. For example, it could be in A-PPDU transmission such as two HE Sounding NDPs consisting of A-PPDU transmission. For another example, it could be one HE Sounding NDP transmission covering all bandwidth assigned for HE STAs and EHT STAs. Here, the HE NDP Announcement frame and the EHT NDP Announcement frame are targeted to HE STAs and EHT STAs, respectively. In the TB sounding protocol sequence, EHT BFRP Trigger frame is one of Trigger frames supporting Special User Info field wherein it allows HE STAs and EHT STAs to be solicited to transmit TB PPDUs in A-PPDU transmission. The duration of inter PPDUs could be SIFS.

When only type of HE Sounding NDP is used for different amendment devices (e.g. HE STAs and EHT STAs), the control signal in SIG field in HE Sounding NDP could be reinterpreted for EHT STAs (or EHT+STAs) as below to feedback the proper Compressed Beamforming/CQI information in response. It means the control information in HE-SIG-A field of HE Sounding NDP could be delivered as RXVECTOR from PHY to MAC in EHT STAs (or EHT+STAs) when receiving it.

- "B0 (Format) field equal to 1(HE SU PPDU as in HE Sounding NDP)" should be interpreted as "PPDU Type And Compression Mode field equal to 1 (EHT MU), EHT-SIG MCS field equal to 0 (BPSK ½), and the Number Of EHT-SIG Symbols field equal to 0 (one OFMD symbol)"
- "Doppler field equal to 0, NSTS And Midamble Periodicity field" should be interpreted as "NSS field"
- Values of the fields having same name (or same functional indication) in SIG field for HE should be interpreted as the value to indicate the same control signal in non-HE PPDU. For example, the PE field equal to 4 µs in HE PPDU should be interpreted as the 4 µs for PE field in non-HE PPDU.
- In case there are no control information in SIG field of HE Sounding NDP to match the control information for EHT STAs (or EHT+STAs), the corresponding control information could be signaled based on the previous PPDU such as NDP Announcement frame targeted to the recipient (using AID in NDP Announcement frame). For example, when NDP Announcement frame indicates EHT NDP Announcement frame with the Sounding Dialog Token field, then receiving the HE Sounding NDP, the value of PHY version Identifier as RXVECTOR parameter could be 0 to indicate EHT type.

When HE Sounding NDPs are transmitted in A-PPDU transmission for different types of devices (e.g. HE STAs and EHT STAs), the Beamformed field in HE Sounding NDPs should set to the same value (e.g. equal to 0 not to be beamformed) in SIG field.

With improved features only in EHT STAs (e.g. increased number of spatial steam, wider bandwidth, higher modulation level, etc.), it may require some restriction on those features for EHT STAs in EHT NDP Announcement frame. There are some examples as below, Operating channel width of the EHT beamformee (MHz) would be up to 160 MHz.

MRU not defined in HE STAs (e.g. INACTIVE_SUB-CHANNEL) wherein MRU is defined in Partial BW Info subfield.

The value of Nc subfield (the number of spatial stream) could be up to 8.

Given A-PPDU transmission consisting of two HE Sounding NDPs, up to 16 spatial streams could be supported for EHT STAs. In this case, the number of spatial streams for EHT STAs should be doubled comparing to HE STAs. To meet LTF end time alignment in two HE Sounding NDPs of A-PPDU transmission, 8 μs per HE-LTF symbol using 2×HE-LTF and 16 μs per HE-LTF symbol using 4×HE-LTF could be used for two HE Sounding NDPs assigned for EHT STAs and HE STAs, respectively. It could be indicated in each SIG field in each HE Sounding NDP in A-PPDU transmission.

INACTIVE_SUBCHANNELS is set to the value of the Disallowed Subchannel Bitmap subfield of the STA Info field with the AID11 subfield set to 2047 in the preceding HE NDP Announcement frame. For EHT NDP Announcement frame, this field not existed because MRU can fully cover this puncturing pattern. That is, to support punctured Sounding NDP format, its patterns should be recognized by HE STAs as well.

Puncturing patterns defined in the Partial BW Info subfield of EHT NDP Announcement frame should be the same as the puncturing patterns defined in HE NDP Announcement frame.

The AID assigned in EHT NDP Announcement frame could be determined based on the invention above.

Those details above could be applied to the following embodiments of the present disclosure even though not mentioned specifically.

Figure 18:
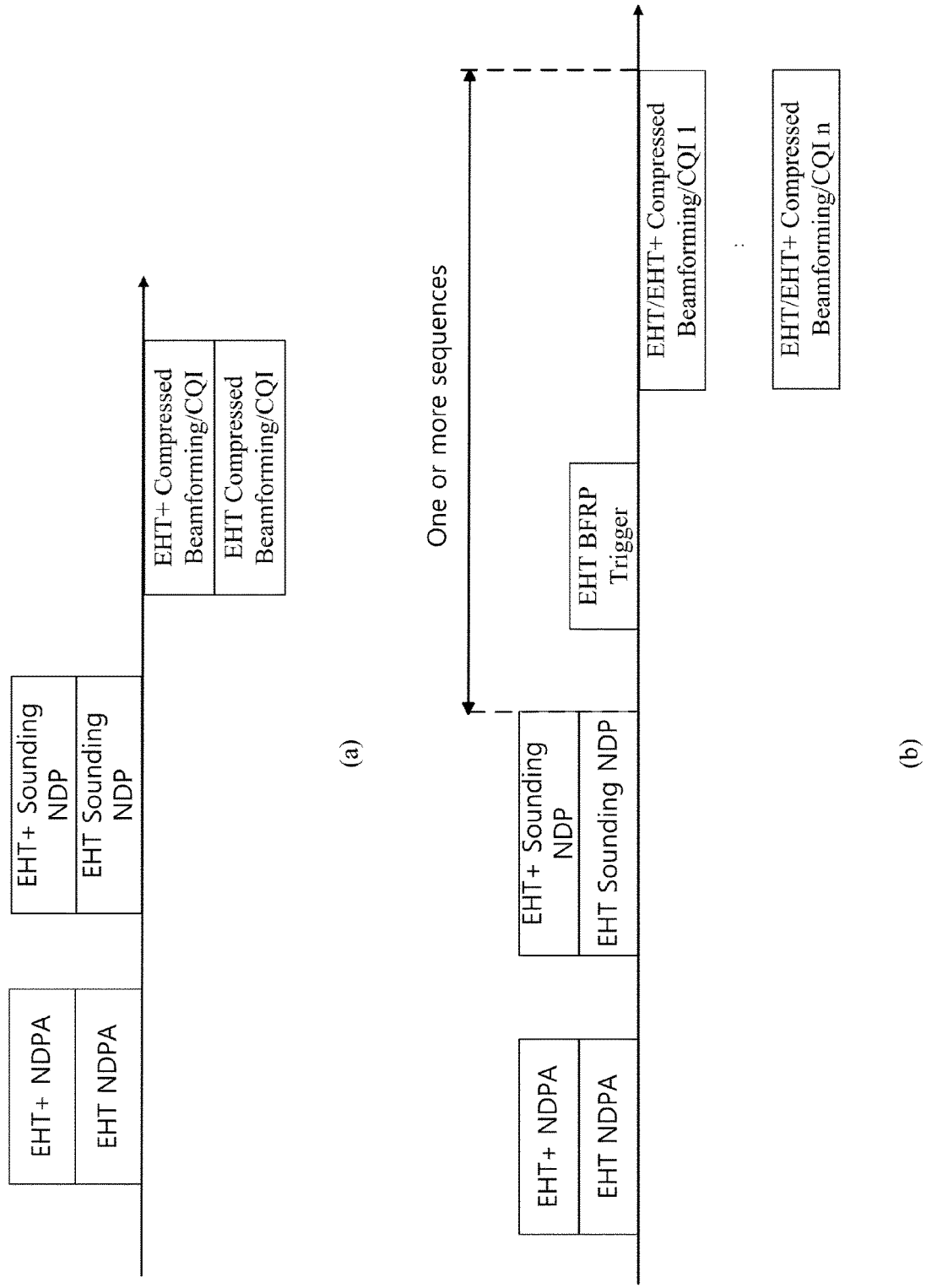
FIG. 18 illustrates an example of a sounding protocol sequence for A-PPDU transmission when recipients are EHT STAs and EHT+STAs according to an embodiment of the present disclosure.

FIG. 18 illustrates an example of a sounding protocol sequence for A-PPDU transmission when recipients are EHT STAs and EHT+STAs according to an embodiment of the present disclosure. A (a) of FIG. 18 is an example of a non-TB sounding protocol sequence using A-PPDU transmission when the recipients are EHT STAs and EHT+STAs and a (b) of FIG. 18 is an example of a TB sounding protocol sequence using A-PPDU transmission when the recipients are EHT STAs and EHT+STAs.

Referring to (a) of FIG. 18, the non-TB sounding protocol sequence for A-PPDU transmission starts with EHT NDP Announcement frame and EHT+NDP Announcement frame in A-PPDU transmission followed by the EHT Sounding NDP and the EHT+ Sounding NDP in A-PPDU transmission for both EHT STAs and EHT+STAs. Here, the EHT NDP Announcement frame and the EHT+NDP Announcement frame are targeted to EHT STAs and EHT+STAs, respectively. The duration of inter PPDUs could be SIFS.

Referring to (b) of FIG. 18, once assuming at least one TB PPDU solicited, the TB sounding protocol sequence for A-PPDU transmission starts with EHT NDP Announcement frame and EHT+NDP Announcement frame in A-PPDU transmission followed by the EHT Sounding NDP and the EHT+ Sounding NDP in A-PPDU transmission for both EHT STAs and EHT+STAs. Here, the EHT NDP Announcement frame and the EHT+NDP Announcement frame are targeted to EHT STAs and EHT+STAs, respectively. In the TB sounding protocol sequence, EHT BFRP Trigger frame could be one of Trigger frames supporting additional Special User Info field wherein it allows EHT STAs and EHT+STAs to be solicited to transmit TB PPDUs in A-PPDU transmission. The duration of inter PPDUs could be SIFS.

To meet the alignment between the EHT Sounding NDP and the EHT+ Sounding NDP, the EHT+ Sounding NDP could be designed based on the EHT Sounding NDP. For example, some or entire fields of the EHT+ Sounding NDP could be designed to meet the one-to-one mapping with some or entire fields of the EHT Sounding NDP in size, duration, and/or functionality.

Figure 19:
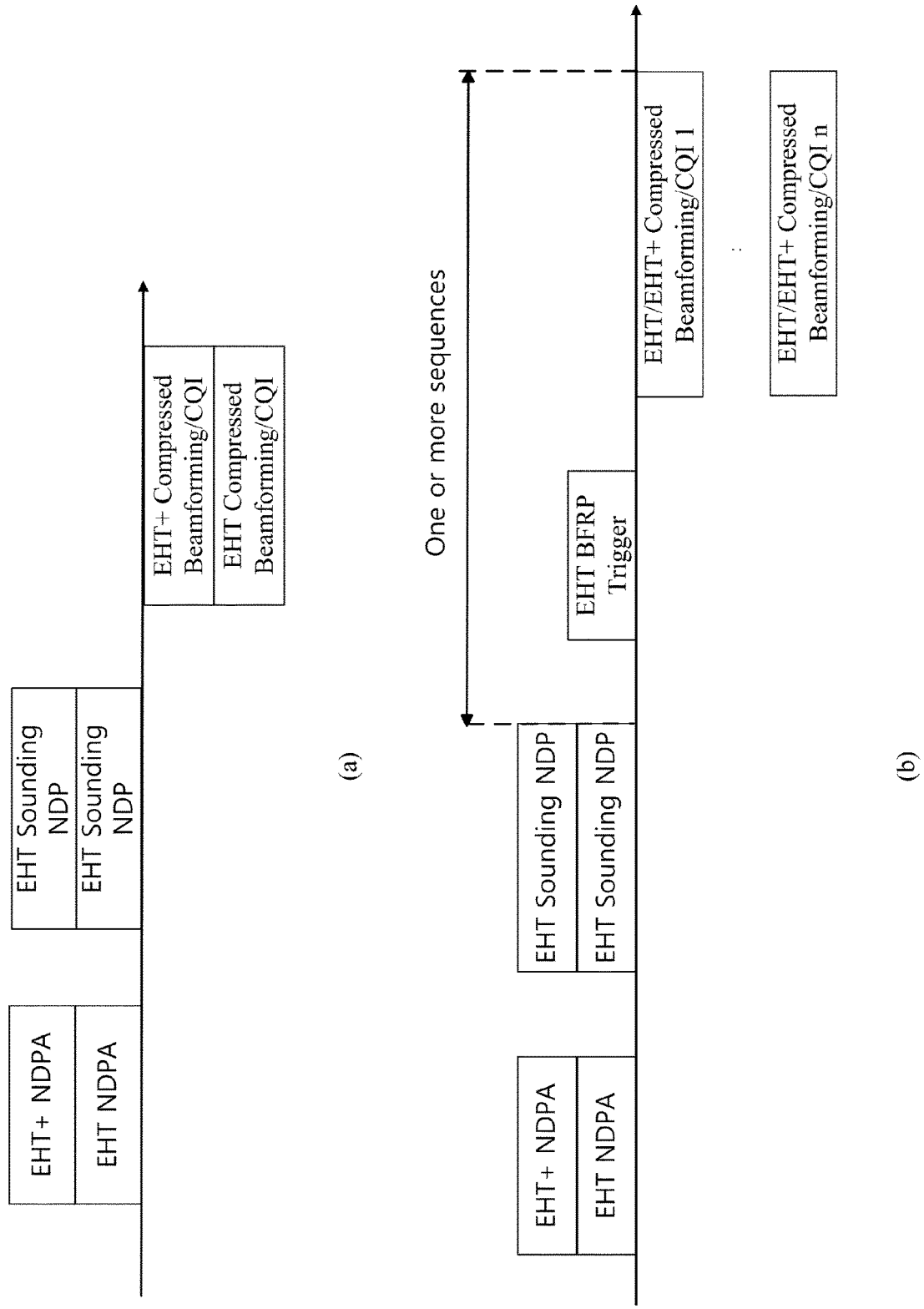
FIG. 19 illustrates an example of a sounding protocol sequence for A-PPDU transmission when recipients are EHT STAs and EHT+STAs according to another embodiment of the present disclosure.

FIG. 19 illustrates an example of a sounding protocol sequence for A-PPDU transmission when recipients are EHT STAs and EHT+STAs according to another embodiment of the present disclosure. A (a) of FIG. 19 is an example of a non-TB sounding protocol sequence using A-PPDU transmission when the recipients are EHT STAs and EHT+STAs and a (b) of FIG. 19 is an example of a TB sounding protocol sequence using A-PPDU transmission when the recipients are EHT STAs and EHT+STAs.

Referring to (a) of FIG. 19, the non-TB sounding protocol sequence for A-PPDU transmission starts with EHT NDP Announcement frame and EHT+NDP Announcement frame in A-PPDU transmission followed by at least one EHT Sounding NDP for both EHT STAs and EHT+STAs. For example, it could be in A-PPDU transmission such as two EHT Sounding NDPs consisting of A-PPDU transmission. For another example, it could be one EHT Sounding NDP transmission covering all bandwidth assigned for EHT STAs and EHT+STAs. Here, the EHT NDP Announcement frame and the EHT+NDP Announcement frame are targeted to EHT STAs and EHT+STAs, respectively. The duration of inter PPDUs could be SIFS.

Referring to (b) of FIG. 19, once assuming at least one TB PPDU solicited, the TB sounding protocol sequence for A-PPDU transmission starts with EHT NDP Announcement frame and EHT+NDP Announcement frame in A-PPDU transmission followed by at least one EHT Sounding NDP for both EHT STAs and EHT+STAs. For example, it could be in A-PPDU transmission such as two EHT Sounding NDPs consisting of A-PPDU transmission. For another example, it could be one EHT Sounding NDP transmission covering all bandwidth assigned for EHT STAs and EHT+STAs. Here, the EHT NDP Announcement frame and the EHT+NDP Announcement frame are targeted to EHT STAs and EHT+STAs, respectively. In the TB sounding protocol sequence, EHT BFRP Trigger frame could be one of Trigger frames supporting additional Special User Info field wherein it allows EHT STAs and EHT+STAs to be solicited to transmit TB PPDUs in A-PPDU transmission. The duration of inter PPDUs could be SIFS.

When only type of EHT Sounding NDP is used for different amendment devices (e.g. EHT STAs and EHT+STAs), EHT Sounding NDP could be designed regardless of amendment version after 11be amendment, then EHT Sounding NDP could be as sounding sequence which means EHT Sounding NDP could be used universally such as U-SIG that is designed to bring forward compatibility to the EHT preamble via the introduction of version independent fields.

Another embodiment to support the sounding protocol sequence for A-PPDU transmission could be considered that A-PPDU transmission is supported only during one or more sequences of HE+BFRP Trigger and HE/HE+ Compressed BF/CQI transmissions. In 11be, there are different types of TB sounding protocol sequences (or non-TB sounding protocol sequences) to be defined depending on whether at least one of beamformees is HE STA or not.

Figure 20:
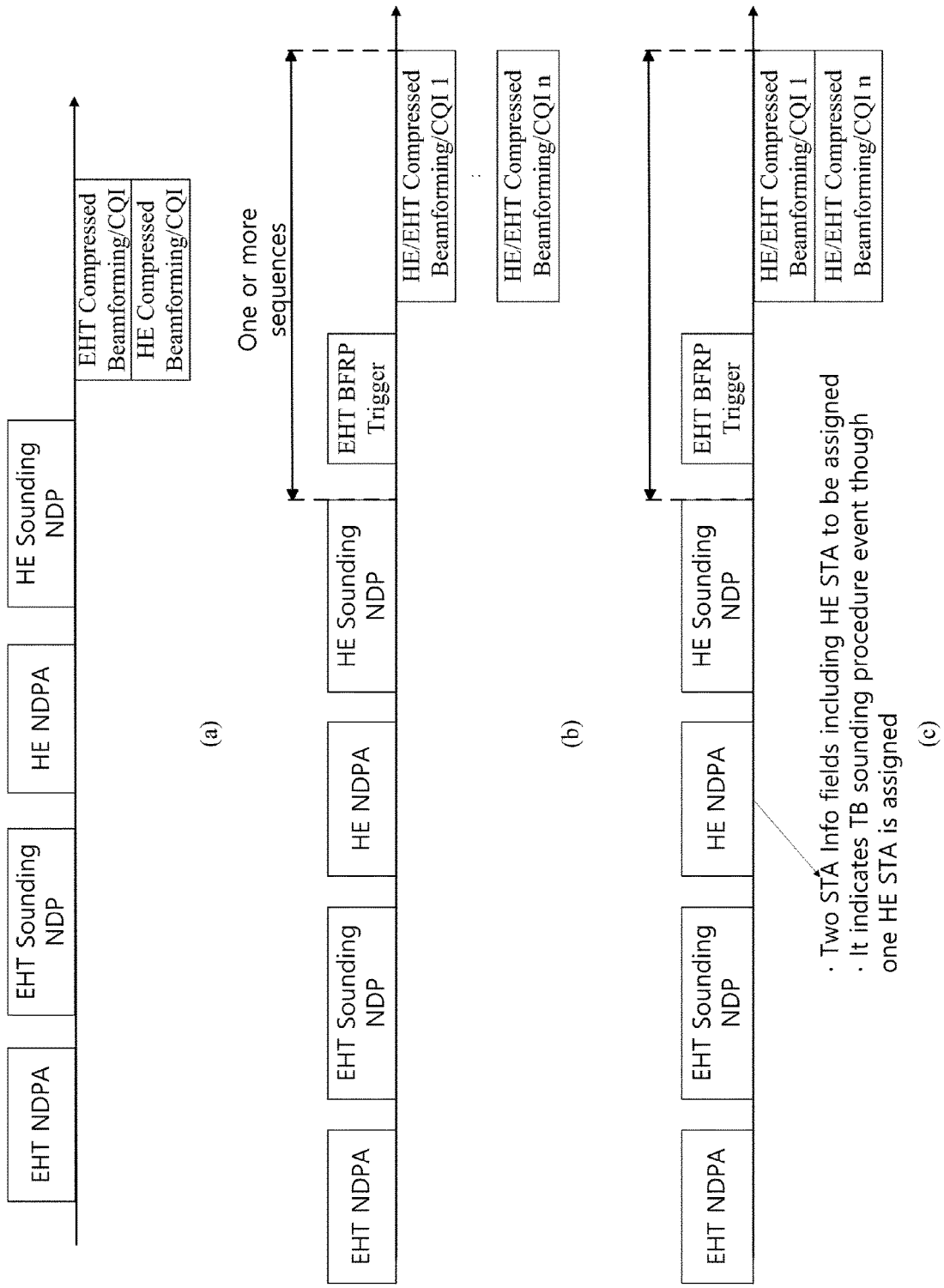
FIG. 20 illustrates an example of a sounding protocol sequence for A-PPDU transmission according to another embodiment of the present disclosure.

FIG. 20 illustrates an example of a sounding protocol sequence for A-PPDU transmission according to another embodiment of the present disclosure. A (a) of FIG. 20 is another example of a non-TB sounding protocol sequence for A-PPDU transmission, a (b) of FIG. 20 is another example of a TB sounding protocol sequence for A-PPDU transmission and a (c) of FIG. 20 is another example of a sounding protocol sequence for A-PPDU transmission using a trigger frame.

Referring to (a) of FIG. 20, to support TB PPDUs combined in A-PPDU transmission from one HE STA and one EHT STA, the non-TB sounding protocol sequence for A-PPDU transmission starts with EHT NDP Announcement frame, EHT Sounding NDP followed by HE NDP Announcement frame, and HE Sounding NDP. For one HE STA, this sounding protocol sequence is transparent such that it starts with HE NDP Announcement frame followed by HE Sounding NDP and HE Compressed BF/CQI as shown in FIG. 13. EHT STAs (or EHT+STAs) could figure out the new type of sounding protocol sequence defined in 11be. For example, depending on the features to be indicated for EHT STAs, (i) the number of spatial stream or the number of EHT-LTF could be up to 16 and (ii) the duration PE field could be 8 µs. The duration between inter PPDUs could be SIFS. In order to indicate this non-TB sounding protocol sequence, either EHT NDP Announcement frame or EHT Sounding NDP could include an indication. For example, this indication could be in the common field in EHT NDP Announcement frame. For example, this indication could be in the U-SIG or EHT-SIG field in EHT Sounding NDP.

Referring to (b) of FIG. 20, to support TB PPDUs combined in A-PPDU transmission from HE STAs and EHT STAs, the TB sounding protocol sequence for A-PPDU transmission starts with EHT NDP Announcement frame, EHT Sounding NDP followed by HE NDP Announcement frame, HE Sounding NDP and EHT BFRP Trigger frame. For HE STAs, this sounding protocol sequence is transparent such that it starts with HE NDP Announcement frame followed by HE Sounding NDP, HE BFRP Trigger frame and HE Compressed BF/CQI as shown in FIG. 13. EHT STAs (or EHT+STAs) could figure out the new type of sounding protocol sequence defined in 11be. For example, depending on the features to be indicated for EHT STAs, (i) the number of spatial stream or the number of EHT-LTF could be up to 16 and (ii) the duration PE field could be 8 µs. The duration between inter PPDUs could be SIFS. In order to indicate this TB sounding protocol sequence, either EHT NDP Announcement frame or EHT Sounding NDP could include an indication. For example, this indication could be in the common field in EHT NDP Announcement frame. For example, this indication could be in the U-SIG or EHT-SIG field in EHT Sounding NDP.

In 11ax, an HE beamformer that initiates the HE non-TB sounding protocol sequence shall transmit the HE NDP Announcement frame with a single STA Info field, the STA Info field having a value in the AID11 field other than 2047 and with the AID11 field in that STA Info field set to the AID of the STA. An HE beamformer may initiate an HE non-TB sounding protocol sequence with an HE beamformee to solicit SU feedback over full bandwidth. And an HE beamformer shall not initiate an HE non-TB sounding protocol sequence with an HE NDP Announcement frame that has a Partial BW Info subfield that indicates less than full bandwidth. An HE TB sounding protocol sequence is initiated by an HE beamformer with a broadcast HE NDP Announcement frame with two or more STA Info fields, followed after a SIFS by an HE sounding NDP followed after a SIFS by a BFRP Trigger frame. Each HE beamformee responds after a SIFS with an HE Compressed Beamforming/CQI frame.

Referring to (c) of FIG. 20, given non-TB protocol sounding sequence without the Trigger frame, even though one HE STA is assigned in A-PPDU transmission, EHT AP should support TB sounding protocol sequence for this HE STA wherein the TB sounding protocol sequence includes at least two STA Info fields. While one STA Info field should be targeted to a intended HE STA, other STA Info field should be assigned to no user. This method could be applicable to one EHT STA and HE STAs consist of sounding sequence in A-PPDU transmission. If needed, the user ID indicating no user assigned could be defined. For HE STAs, it could be the values which are reserved. For EHT STAs, it could be the values which are reserved or separately defined as A. A could be 2008-2042 or 2046 as shown in Table 8 above.

Figure 21:
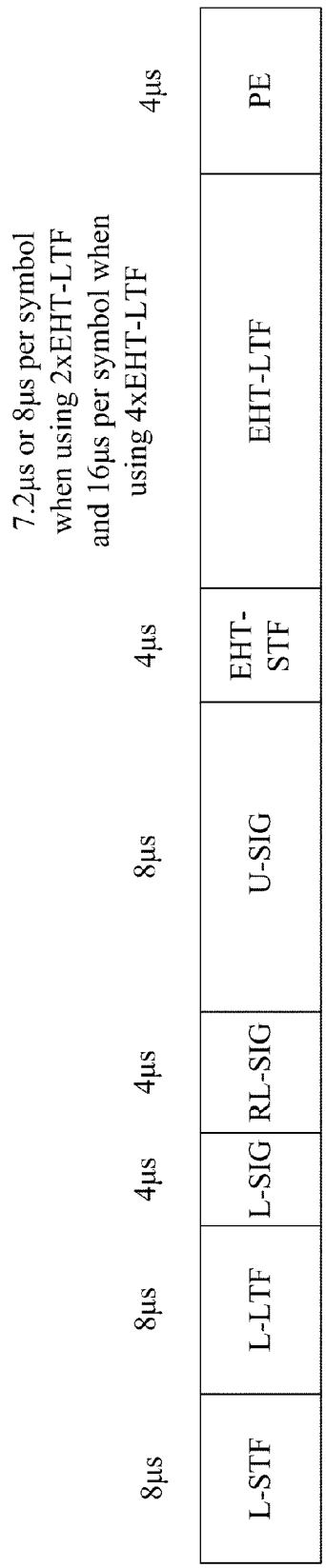
FIG. 21 illustrates an example of the new EHT Sounding NDP for A-PPDU transmission according to an embodiment of present disclose.

Another embodiment to support the sounding protocol sequence for A-PPDU transmission is to develop a new type of Sounding NDP format for A-PPDU transmission as shown in FIG. 21 below to align each other.

FIG. 21 illustrates an example of the new EHT Sounding NDP for A-PPDU transmission according to an embodiment of present disclose.

Referring to FIG. 21, the new EHT Sounding NDP has the following properties: (i) the new EHT Sounding NDP reuses the original EHT Sounding NDP (e.g. EHT Sounding NDP of (b) of FIG. 15) without the EHT-SIG field, (ii) the new EHT Sounding NDP has only PE field with 4 µs in duration. The new EHT Sounding NDP could be indicated implicitly or explicitly. The implicit way is that NDP Announcement frame for A-PPDU transmission is followed by Sounding NDP for A-PPDU transmission consisting of HE Sounding NDP and EHT Sounding NDP. The explicit way is to include a control signal in the U-SIG field of the new EHT Sounding NDP. In order to remove the EHT-SIG field, the U-SIG field of the new EHT Sounding NDP should contain the control information that originally carried in EHT-SIG field. For example, some subfield in U-SIG field of the new EHT Sounding NDP could be reinterpreted as part or entire the Spatial Reuse subfield, GI+LTF Size subfield, Number of EHT-LTF Symbols subfield, NSS subfield, or Beamformed subfield. Given Sounding NDP indicated, the Disregard subfield or any unnecessary subfields could be reinterpreted.

However, if the U-SIG field of the new EHT Sounding NDP is not still enough to cover the control information in the EHT-SIG field, some values in HE-SIG-A of HE Sounding NDP could be shared. For example, the same value in the GI+HE-LTF Size subfield in HE-SIG-A field could be used to indicate for EHT STAs because the same format of GI/LTF could be applied to the HE Sounding NDP and the original EHT Sounding NDP. For example, the same value in the Beamformed subfield in HE-SIG-A field could be used to indicate for EHT STAs because it is common sense not to apply beamforming to Sounding NDP.

Figure 22:
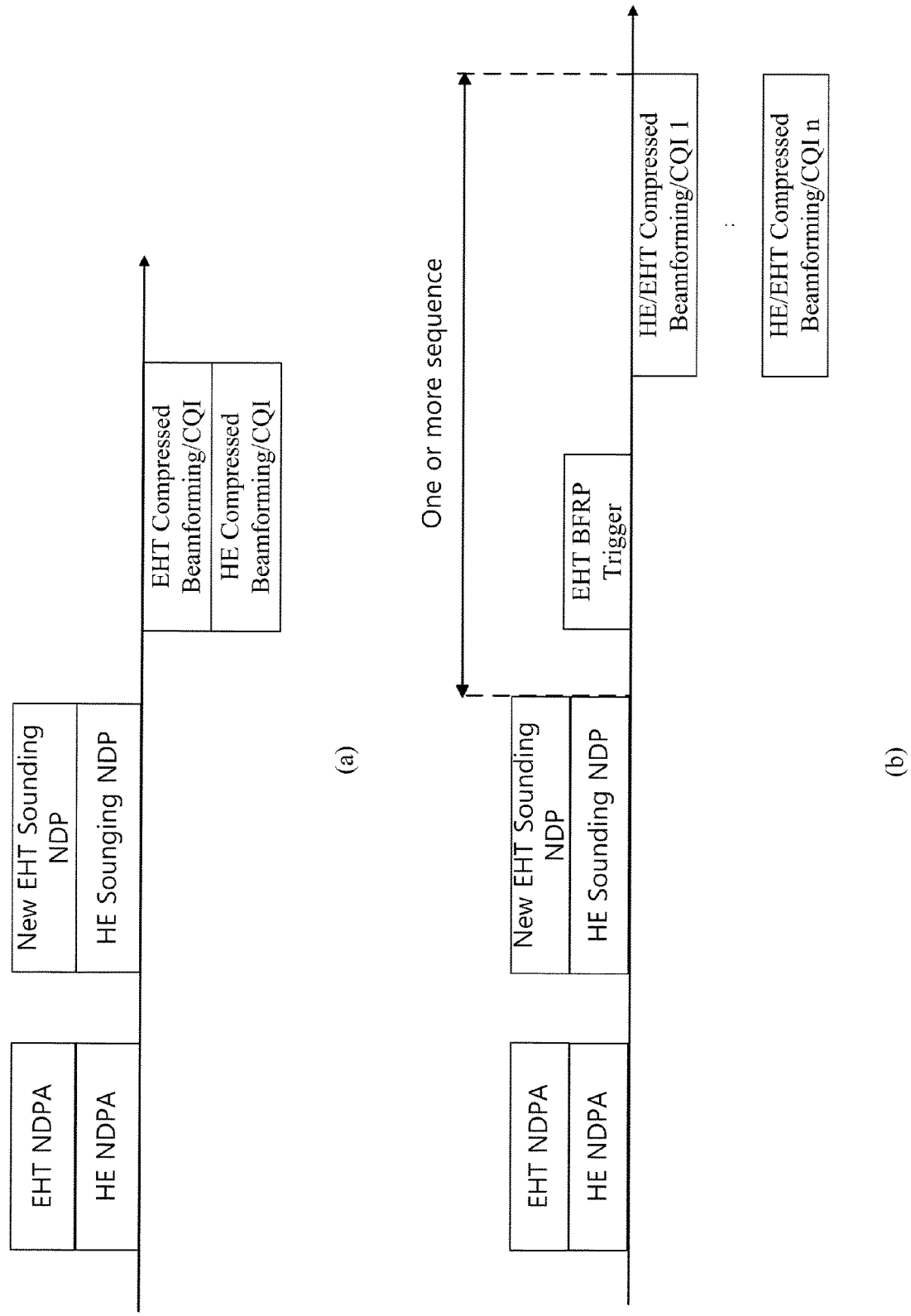
FIG. 22 illustrates an example of a sounding protocol sequence using the new EHT Sounding NDP for A-PPDU transmission according to an embodiment of the present disclosure.

FIG. 22 illustrates an example of a sounding protocol sequence using the new EHT Sounding NDP for A-PPDU transmission according to an embodiment of the present disclosure. A (a) of FIG. 22 is an example of a non-TB sounding protocol sequence using the new EHT Sounding NDP for A-PPDU transmission and a (b) of FIG. 22 is an example of a TB sounding protocol sequence using the new EHT Sounding NDP for A-PPDU transmission.

Referring to (a) of FIG. 22, the non-TB sounding protocol sequence for A-PPDU transmission starts with HE NDP Announcement frame and EHT NDP Announcement frame in A-PPDU transmission followed by the HE Sounding NDP and the new EHT Sounding NDP in A-PPDU transmission for both HE STAs and EHT STAs. Here, the HE NDP Announcement frame and the EHT NDP Announcement frame are targeted to HE STAs and EHT STAs, respectively. The duration of inter PPDUs could be SIFS.

Referring to (b) of FIG. 22, once assuming at least one TB PPDU solicited, the TB sounding protocol sequence for A-PPDU transmission starts with HE NDP Announcement frame and EHT NDP Announcement frame in A-PPDU transmission followed by the HE Sounding NDP and the new EHT Sounding NDP in A-PPDU transmission for both HE STAs and EHT STAs. For example, it could be in A-PPDU transmission such as two HE Sounding NDPs consisting of A-PPDU transmission. Here, the HE NDP Announcement frame and the EHT NDP Announcement frame are targeted to HE STAs and EHT STAs, respectively. In the TB sounding protocol sequence, EHT BFRP Trigger frame is one of Trigger frames supporting Special User Info field wherein it allows HE STAs and EHT STAs to be solicited to transmit TB PPDUs in A-PPDU. transmission The duration of inter PPDUs could be SIFS.

Figure 23:
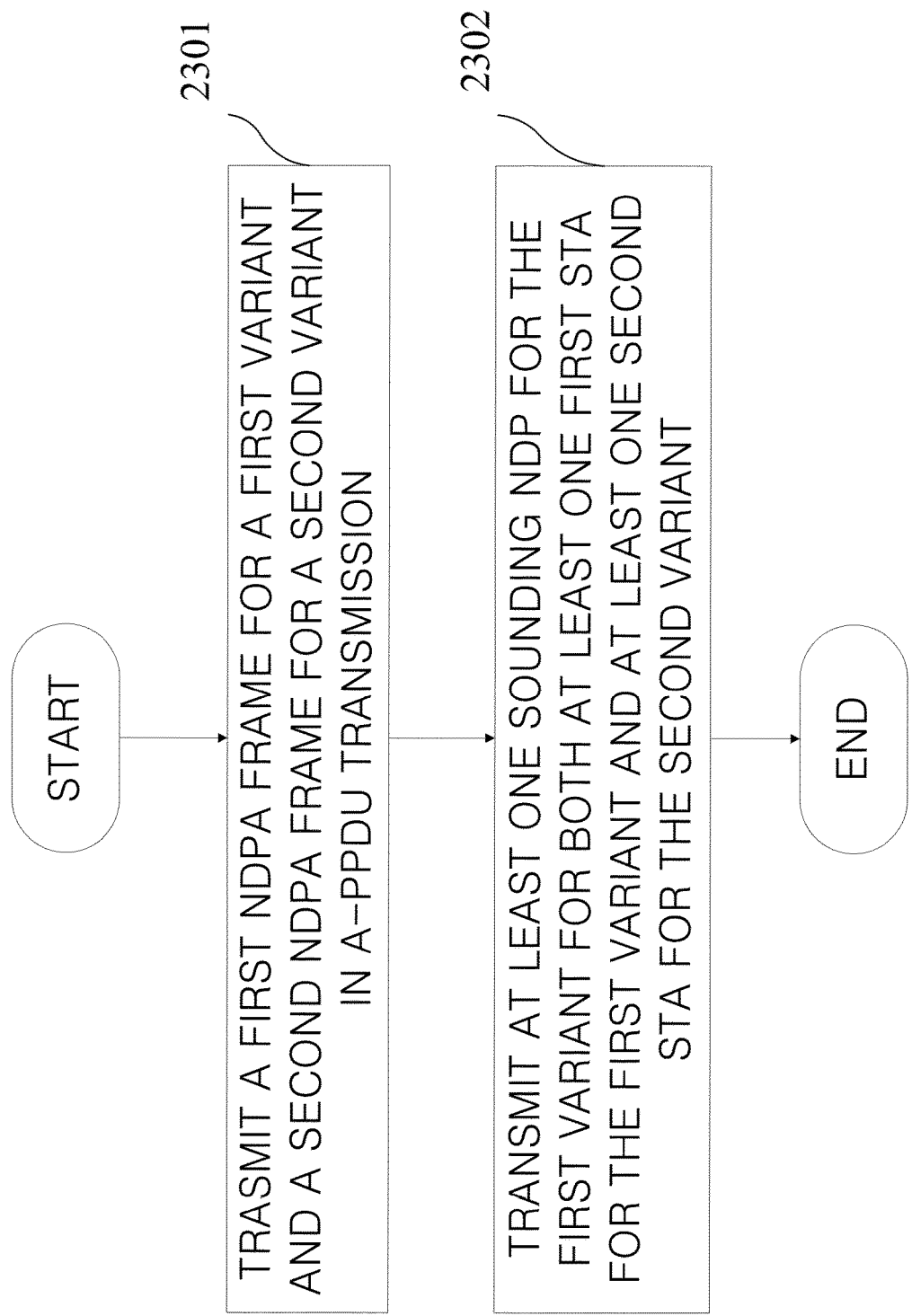
FIG. 23 illustrates a flowchart of a sounding protocol sequence for A-PPDU transmission by a transmitter according to an embodiment of the present disclosure.

FIG. 23 illustrates a flowchart 2300 of a sounding protocol sequence for A-PPDU transmission by a transmitter according to an embodiment of the present disclosure.

Referring to FIG. 23, in step 2301, a transmitter (e.g. a EHT AP) transmits a first NDP Announcement frame for a first variant and a second NDP Announcement frame for a second variant in A-PPDU transmission. In some embodiments, the first NDP Announcement frame for the first variant and the second NDP Announcement frame for the second variant have a same time duration and are transmitted in different frequency bands. For example, the EHT AP transmits the HE NDP Announcement frame and the EHT NDP Announcement frame in A-PPDU transmission.

In step 2302, the transmitter transmits at least one Sounding NDP for the first variant for both at least one first STA for the first variant and the at least one second STA for the second variant. In some embodiments, the transmitter transmits one first Sounding NDP for the first variant covering all bandwidth assigned for the at least one first STA for the first variant and the at least one second STA for the second variant. In other embodiments, the transmitter transmits a first Sounding NDP for the first variant and a second Sounding NDP for the first variant in the A-PPDU transmission to cover a first bandwidth assigned for the at least one first STA for the first variant and a second bandwidth assigned for the at least one second STA for the second variant, respectively, wherein the first Sounding NDP for the first variant and the second Sounding NDP for the first variant have a same time duration and are transmitted in different frequency bands. For example, the EHT AP transmits one HE Sounding NDP for covering all bandwidth assigned for the HE STAs and the EHT STAs. For another example, the EHT AP transmits first HE Sounding NDP for the HE STAs and second HE Sounding NDP for the EHT STAs in A-PPDU transmission.

In some embodiments, the first variant is based on a first protocol standard and the second variant is based on a second protocol standard and the second protocol standard is beyond version of the first protocol standard. For example, the first protocol standard corresponds to 11ax (or HE) and the second protocol standard corresponds to 11be (or EHT).

In some embodiments, first control information in first SIG field in the at least one Sounding NDP for the first variant is reinterpreted for the at least one second STA for the second variant as second control information in second SIG field in a Sounding NDP for the second variant.

In some embodiments, at least one first subfield in the first SIG field in the at least one Sounding NDP for the first variant is reinterpreted for the at least one second STA for the second variant as a second subfield in the second SIG field in the Sounding NDP for the second variant.

In some embodiments, a first subfield in the first SIG field in the at least one Sounding NDP for the first variant having a same name with a second subfield in the second SIG field in the Sounding NDP for the second variant is reinterpreted for the at least one second STA for the second variant as a value to indicate a same control information.

In some embodiments, if the at least one Sounding NDP for the first variant includes a first Sounding NDP for the first variant and a second Sounding NDP for the first variant in the A-PPDU transmission, a first number of a first type of a first subfield is included in the first Sounding NDP for the first variant to indicate a number of a first spatial stream for the at least one first STA for the first variant and a second number of a second type of a second subfield is included in the second Sounding NDP for the first variant to indicate a number of a second spatial stream for the at least one second STA for the second variant, wherein a duration of the first number of the first type of the first subfield in the first Sounding NDP for the first variant is a same with a duration of the second number of the second type of the second subfield in the second Sounding NDP for the first variant.

In some embodiments, the transmitter transmits a trigger frame for the second variant, wherein the trigger frame for the second variant includes a special user information field allowing the at least one first STA for the first variant and the at least one second STA for the second variant to be solicited to transmit trigger-based PPDUs in the A-PPDU transmission. For example, the EHT AP transmits the EHT BFRP Trigger frame.

Figure 24:
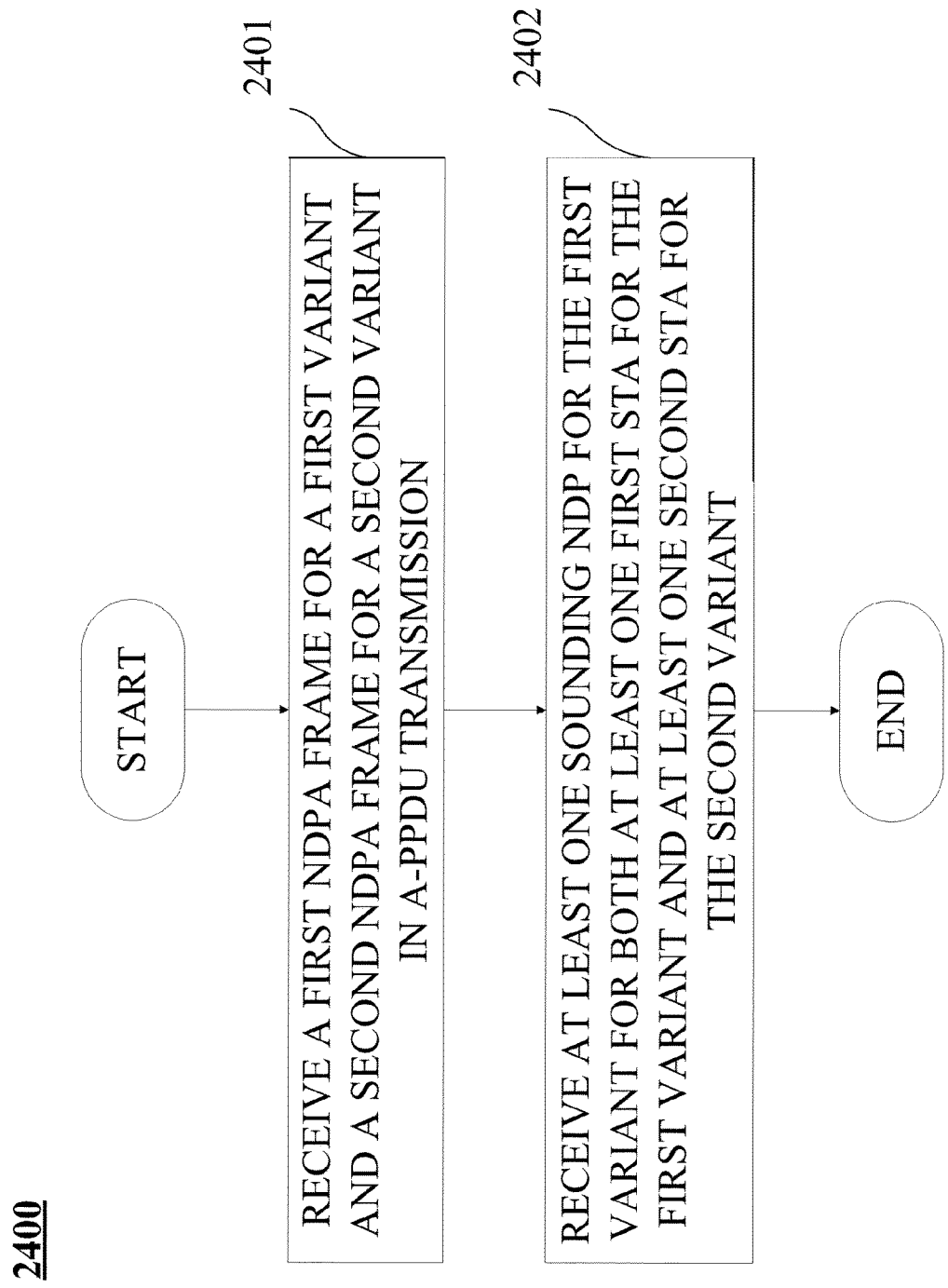
FIG. 24 illustrates a flowchart of a sounding protocol sequence for A-PPDU transmission by a receiver according to an embodiment of the present disclosure.

FIG. 24 illustrates a flowchart 2400 of a sounding protocol sequence for A-PPDU transmission by receiver according to an embodiment of the present disclosure.

Referring to FIG. 24, in step 2401, a receiver (e.g. a HE STA or a EHT STA) receive a first NDP Announcement frame for a first variant and a second NDP Announcement frame for a second variant in A-PPDU transmission. In some embodiments, the first NDP Announcement frame for the first variant and the second NDP Announcement frame for the second variant have a same time duration and are received in different frequency bands. For example, the EHT STA receives the HE NDP Announcement frame and the EHT NDP Announcement frame in A-PPDU transmission.

In step 2402, the receiver receives at least one Sounding NDP for the first variant for both at least one first STA for the first variant and the at least one second STA for the second variant. In some embodiments, the receiver receives one first Sounding NDP for the first variant covering all bandwidth assigned for the at least one first STA for the first variant and the at least one second STA for the second variant. In other embodiments, the receiver receives a first Sounding NDP for the first variant and a second Sounding NDP for the first variant in the A-PPDU transmission to cover a first bandwidth assigned for the at least one first STA for the first variant and a second bandwidth assigned for the at least one second STA for the second variant, respectively, wherein the first Sounding NDP for the first variant and the second Sounding NDP for the first variant have a same time duration and are transmitted in different frequency bands. For example, the HE STA (or EHT STA) receives one HE Sounding NDP for covering all bandwidth assigned for the HE STAs and the EHT STAs. For another example, the HE STA (or EHT STA) receives first HE Sounding NDP for the HE STAs and second HE Sounding NDP for the EHT STAs in A-PPDU transmission.

In some embodiments, the first variant is based on a first protocol standard and the second variant is based on a second protocol standard and the second protocol standard is beyond version of the first protocol standard. For example, the first protocol standard corresponds to 11ax (or HE) and the second protocol standard corresponds to 11be (or EHT).

In some embodiments, first control information in first SIG field in the at least one Sounding NDP for the first variant is reinterpreted for the at least one second STA for the second variant as second control information in second SIG field in a Sounding NDP for the second variant.

In some embodiments, at least one first subfield in the first SIG field in the at least one Sounding NDP for the first variant is reinterpreted for the at least one second STA for the second variant as a second subfield in the second SIG field in the Sounding NDP for the second variant.

In some embodiments, a first subfield in the first SIG field in the at least one Sounding NDP for the first variant having a same name with a second subfield in the second SIG field in the Sounding NDP for the second variant is reinterpreted for the at least one second STA for the second variant as a value to indicate a same control information.

In some embodiments, if the at least one Sounding NDP for the first variant includes a first Sounding NDP for the first variant and a second Sounding NDP for the first variant in the A-PPDU transmission, a first number of a first type of a first subfield is included in the first Sounding NDP for the first variant to indicate a number of a first spatial stream for the at least one first STA for the first variant and a second number of a second type of a second subfield is included in the second Sounding NDP for the first variant to indicate a number of a second spatial stream for the at least one second STA for the second variant, wherein a duration of the first number of the first type of the first subfield in the first Sounding NDP for the first variant is a same with a duration of the second number of the second type of the second subfield in the second Sounding NDP for the first variant.

In some embodiments, the receiver receives a trigger frame for the second variant, wherein the trigger frame for the second variant includes a special user information field allowing the at least one first STA for the first variant and the at least one second STA for the second variant to be solicited to transmit trigger-based PPDUs in the A-PPDU transmission. For example, the HE STA (or the EHT STA) receives the EHT BFRP Trigger frame.

In some embodiments, the receiver estimates a channel based on the at least one Sounding NDP. In some embodiments, if the at least one Sounding NDP includes only one first Sounding NDP, the receiver estimates the channel based on the only one first Sounding NDP. In other embodiments, if the at least one Sounding NDP includes the first Sounding NDP and the second Sounding NDP in the A-PPDU transmission, the receiver estimates the channel based on the corresponding Sounding NDP. In some embodiments, the receiver transmits a feedback frame including estimated channel information.

All embodiments for sounding protocol sequences for A-PPDU transmission defined in this present disclosure could be combined partially to be used depending on the different circumstances.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by an apparatus in a wireless local area network (WLAN), the method comprising:
    transmitting a first null data packet (NDP) Announcement physical layer convergence protocol (PLCP) protocol data unit (PPDU) compliant with a first variant and a second NDP Announcement PPDU compliant with a second variant at the same time in aggregated-PPDU (A-PPDU) transmission, wherein the first NDP Announcement PPDU compliant with the first variant and the second NDP Announcement PPDU compliant with the second variant have a same time duration and are transmitted in different frequency bands; and
    transmitting at least one Sounding NDP compliant with the first variant for both at least one first station (STA) compliant with the first variant and at least one second STA compliant with the second variant a predetermined time after the first NDP Announcement PPDU compliant with the first variant and the second NDP Announcement PPDU compliant with the second variant are transmitted at the same time in A-PPDU transmission,
    wherein the first variant is based on a first protocol standard and the second variant is based on a second protocol standard, and
    wherein the second protocol standard is beyond version of the first protocol standard.

2. The method of claim 1, wherein transmitting the at least one Sounding NDP compliant with the first variant comprises:
    transmitting one first Sounding NDP compliant with the first variant covering all bandwidth assigned for the at least one first STA compliant with the first variant and the at least one second STA compliant with the second variant.

3. The method of claim 1, wherein transmitting the at least one Sounding NDP compliant with the first variant comprises:
    transmitting a first Sounding NDP compliant with the first variant and a second Sounding NDP compliant with the first variant in the A-PPDU transmission to cover a first bandwidth assigned for the at least one first STA compliant with the first variant and a second bandwidth assigned for the at least one second STA compliant with the second variant, respectively,
    wherein the first Sounding NDP compliant with the first variant and the second Sounding NDP compliant with the first variant have a same time duration and are transmitted in different frequency bands.

4. The method of claim 1, wherein first control information in first signal (SIG) field in the at least one Sounding NDP compliant with the first variant is reinterpreted for the at least one second STA compliant with the second variant as second control information in second SIG field in a Sounding NDP compliant with the second variant.

5. The method of claim 4, wherein a first subfield in the first SIG field in the at least one Sounding NDP compliant with the first variant is reinterpreted for the at least one second STA compliant with the second variant as at least one second subfield in the second SIG field in the Sounding NDP compliant with the second variant,
wherein the first subfield indicates a type of a first PPDU compliant with the first variant, and
wherein the at least one second subfield indicates a type of a second PPDU compliant with the second variant.

6. The method of claim 4, wherein at least one first subfield in the first SIG field in the at least one Sounding NDP compliant with the first variant is reinterpreted for the at least one second STA compliant with the second variant as a second subfield in the second SIG field in the Sounding NDP compliant with the second variant.

7. The method of claim 4, wherein a first subfield in the first SIG field in the at least one Sounding NDP compliant with the first variant having a same name with a second subfield in the second SIG field in the Sounding NDP compliant with the second variant is reinterpreted for the at least one second STA compliant with the second variant as a value to indicate a same control information.

8. The method of claim 4, wherein, if the at least one Sounding NDP compliant with the first variant includes a first Sounding NDP compliant with the first variant and a second Sounding NDP compliant with the first variant in the A-PPDU transmission, a first number of a first type of a first subfield is included in the first Sounding NDP compliant with the first variant to indicate a number of a first spatial stream for the at least one first STA compliant with the first variant and a second number of a second type of a second subfield is included in the second Sounding NDP compliant with the first variant to indicate a number of a second spatial stream for the at least one second STA compliant with the second variant, wherein a duration of the first number of the first type of the first subfield in the first Sounding NDP compliant with the first variant is a same with a duration of the second number of the second type of the second subfield in the second Sounding NDP compliant with the first variant.

9. The method of claim 1, further comprising:
transmitting a trigger frame compliant with the second variant, wherein the trigger frame compliant with the second variant includes a special user information field allowing the at least one first STA compliant with the first variant and the at least one second STA compliant with the second variant to be solicited to transmit trigger-based PPDUs in the A-PPDU transmission.

10. An apparatus in a wireless local area network (WLAN), the apparatus comprising:
a transceiver; and
a processor configured to:
control the transceiver to transmit a first null data packet (NDP) Announcement physical layer convergence protocol (PLCP) protocol data unit (PPDU) compliant with a first variant and a second NDP Announcement PPDU compliant with a second variant at the same time in aggregated-PPDU (A-PPDU) transmission, wherein the first NDP Announcement PPDU compliant with the first variant and the second NDP Announcement PPDU compliant with the second variant have a same time duration and are transmitted in different frequency bands; and
control the transceiver to transmit at least one Sounding NDP compliant with the first variant for both at least one first station (STA) compliant with the first variant and at least one second STA compliant with the second variant a predetermined time after the first NDP Announcement PPDU compliant with the first variant and the second NDP Announcement PPDU compliant with the second variant are transmitted at the same time in A-PPDU transmission,
wherein the first variant is based on a first protocol standard and the second variant is based on a second protocol standard, and
wherein the second protocol standard is beyond version of the first protocol standard.

11. The apparatus of claim 10, wherein the processor is configured to:
control the transceiver to transmit one first Sounding NDP compliant with the first variant covering all bandwidth assigned for the at least one first STA compliant with the first variant and the at least one second STA compliant with the second variant.

12. The apparatus of claim 10, wherein the processor is configured to:
control the transceiver to transmit a first Sounding NDP compliant with the first variant and a second Sounding NDP compliant with the first variant in the A-PPDU transmission to cover a first bandwidth assigned for the at least one first STA compliant with the first variant and a second bandwidth assigned for the at least one second STA compliant with the second variant, respectively,
wherein the first Sounding NDP compliant with the first variant and the second Sounding NDP compliant with the first variant have a same time duration and are transmitted in different frequency bands.

13. The apparatus of claim 10, wherein first control information in first signal (SIG) field in the at least one Sounding NDP compliant with the first variant is reinterpreted for the at least one second STA compliant with the second variant as second control information in second SIG field in a Sounding NDP compliant with the second variant.

14. The apparatus of claim 13, wherein a first subfield in the first SIG field in the at least one Sounding NDP compliant with the first variant is reinterpreted for the at least one second STA compliant with the second variant as at least one second subfield in the second SIG field in the Sounding NDP compliant with the second variant,
wherein the first subfield indicates a type of a first PPDU compliant with the first variant, and
wherein the at least one second subfield indicates a type of a second PPDU compliant with the second variant.

15. The apparatus of claim 13, wherein at least one first subfield in the first SIG field in the at least one Sounding NDP compliant with the first variant is reinterpreted for the at least one second STA compliant with the second variant as a second subfield in the second SIG field in the Sounding NDP compliant with the second variant.

16. The apparatus of claim 13, wherein a first subfield in the first SIG field in the at least one Sounding NDP compliant with the first variant having a same name with a second subfield in the second SIG field in the Sounding NDP compliant with the second variant is reinterpreted for the at least one second STA compliant with the second variant as a value to indicate a same control information.

17. The apparatus of claim 13, wherein, if the at least one Sounding NDP compliant with the first variant includes a first Sounding NDP compliant with the first variant and a second Sounding NDP compliant with the first variant in the A-PPDU transmission, a first number of a first type of a first subfield is included in the first Sounding NDP compliant with the first variant to indicate a number of a first spatial stream for the at least one first STA compliant with the first variant and a second number of a second type of a second subfield is included in the second Sounding NDP compliant with the first variant to indicate a number of a second spatial stream for the at least one second STA compliant with the second variant, wherein a duration of the first number of the first type of the first subfield in the first Sounding NDP compliant with the first variant is a same with a duration of the second number of the second type of the second subfield in the second Sounding NDP compliant with the first variant.

18. The apparatus of claim 10, wherein the processor is further configured to:
control the transceiver to transmit a trigger frame compliant with the second variant, wherein the trigger frame compliant with the second variant includes a special user information field allowing the at least one first STA compliant with the first variant and the at least one second STA compliant with the second variant to be solicited to transmit trigger-based PPDUs in the A-PPDU transmission.

\* \* \* \* \*